United States Patent
Matsumoto et al.

(10) Patent No.: US 8,641,181 B2
(45) Date of Patent: Feb. 4, 2014

(54) IMAGE FORMING METHOD

(75) Inventors: Jun Matsumoto, Kanagawa (JP); Koji Yasuda, Kanagawa (JP); Kiyoshi Irita, Kanagawa (JP); Misato Sasada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 353 days.

(21) Appl. No.: 13/071,537

(22) Filed: Mar. 25, 2011

(65) Prior Publication Data
US 2011/0234684 A1    Sep. 29, 2011

(30) Foreign Application Priority Data

Mar. 29, 2010    (JP) ................... 2010-076013

(51) Int. Cl.
*C09D 11/00*    (2006.01)
(52) U.S. Cl.
USPC .................. 347/100; 428/32.1; 428/32.24
(58) Field of Classification Search
USPC ................ 347/100; 428/32.1, 32.24
See application file for complete search history.

(56) References Cited

U.S. PATENT DOCUMENTS

| | | | |
|---|---|---|---|
| 2004/0050292 A1* | 3/2004 | Nakajima et al. | 106/31.27 |
| 2006/0004116 A1 | 1/2006 | Kishi et al. | |
| 2006/0238591 A1* | 10/2006 | Matsuhashi et al. | 347/102 |
| 2009/0053409 A1* | 2/2009 | Yamamoto et al. | 427/195 |
| 2009/0075206 A1* | 3/2009 | Kanchiku et al. | 430/286.1 |
| 2009/0128611 A1 | 5/2009 | Kariya et al. | |
| 2009/0136680 A1 | 5/2009 | Kishi et al. | |
| 2010/0324163 A1 | 12/2010 | Shinjo | |

FOREIGN PATENT DOCUMENTS

| | | | | |
|---|---|---|---|---|
| EP | 2028016 | | 2/2009 | |
| EP | 2060404 A | | 5/2009 | |
| EP | 2123461 A | | 11/2009 | |
| JP | 2001-323194 A | | 11/2001 | |
| JP | 2005-307199 | | 11/2005 | |
| JP | 2007-099802 | | 4/2007 | |
| JP | 2007197544 A | * | 8/2007 | ............. C09D 11/00 |

(Continued)

OTHER PUBLICATIONS

Partial English language translation of the following: Office action dated Jul. 16, 2013 from the Japanese Patent Office in a Japanese patent application corresponding to the instant patent application. This office action translation is submitted now in order to supplement the understanding of patent documents JP 2009-125940, JP2008-045047, JP2008-266635, JP2007-099802 and JP2008-260139 which are cited in the office action and are being disclosed in the instant information Disclosure Statement.

*Primary Examiner* — Laura Martin
(74) *Attorney, Agent, or Firm* — Solaris Intellectual Property Group, PLLC

(57) ABSTRACT

Provided is an image forming method including applying an ink that forms an image by inkjetting an ink composition containing coloring particles, a water-soluble polymerizable compound, a polymerization initiator and water onto a recording medium in which a base paper, a first layer containing a binder, and a second layer containing a white pigment are layered in this order, and a Cobb water absorption degree on a surface of the first layer placed on the base paper is 5.0 g/m$^2$ or less as measured by a water absorption degree test according to JIS P8140 with a contact time of 15 seconds, and a water absorption amount on a surface of the second layer is 2 mL/m$^2$ to 8 mL/m$^2$ as measured by a Bristow method with a contact time of 0.5 seconds.

21 Claims, 1 Drawing Sheet

(56) References Cited

FOREIGN PATENT DOCUMENTS

| JP | 2008-045047 | 2/2008 |
| JP | 2008-260139 | 10/2008 |
| JP | 2008-266635 | 11/2008 |
| JP | 2009-73158 A | 4/2009 |
| JP | 2009-125940 | 6/2009 |

* cited by examiner

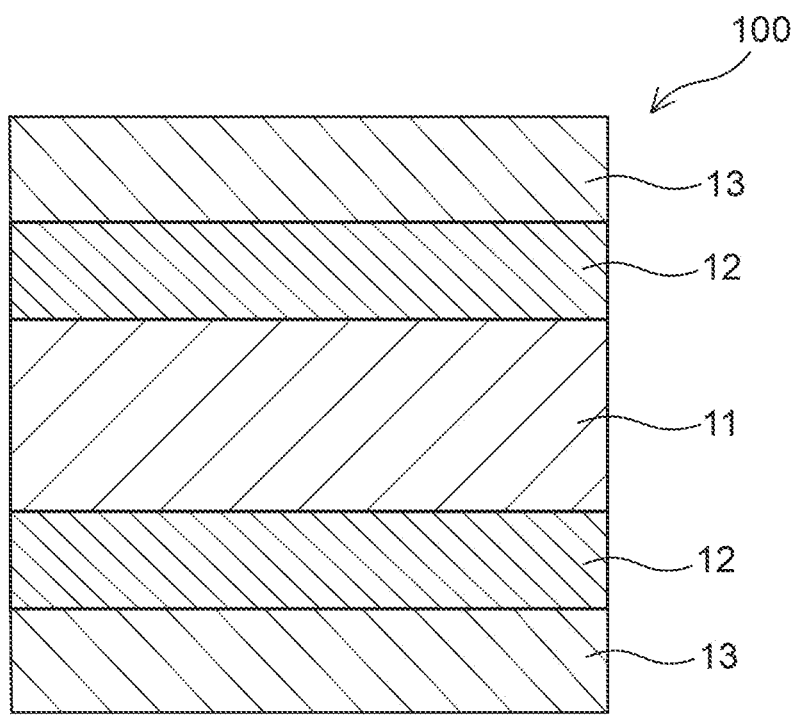

IMAGE FORMING METHOD

CROSS-REFERENCE TO RELATED APPLICATION

This application claims priority under 35 USC 119 from Japanese Patent Application No. 2010-076013, filed on Mar. 29, 2010, the disclosure of which is incorporated by reference herein.

BACKGROUND OF THE INVENTION

1. Field of the Invention

The present invention relates to an image forming method.

2. Description of the Related Art

Ink jet techniques have been applied to office printers, home printers, and the like. Furthermore, they are being recently applied to commercial printing. In commercial printing, printed sheets are required to have print feel similar to that of general printing paper, rather than having print feel of a surface of an ink jet paper on which an ink absorption layer is formed on a resin coated paper that completely shuts out penetration of ink solvent into base paper.

Further, it is required for an image to be formed to have high quality.

In connection with the above, a recording medium with improved curl and cockle while print feel is maintained by forming a blocking layer using a binder and a white pigment layer of which water absorption amount is controlled has been disclosed (for example, Japanese Patent Application Laid-Open (JP-A) No. 2009-73158).

Further, a recording method which uses a photocurable aqueous monomer ink on a paper recording medium has been disclosed (for example, JP-A No. 2001-323194).

However, even for the image forming method using a recording medium described in JP-A No. 2009-73158, further improvement in curl and cockle has been desired, and also more improved adhesion to an image to be formed has been waited for.

Further, according to JP-A No. 2001-323194, only the image forming method using an ink jet paper is described and a printed material having a feel like that of general paper cannot be obtained.

The present invention, which is devised in view of the above, has an object of providing a method of forming an image with excellent adhesion to a medium for recording an image to be formed by inhibiting occurrence of a curl and a cockle at the time of forming the image.

SUMMARY OF THE INVENTION

The invention has been made in view of the above circumstances and provides an image forming method.

A first aspect of the invention provides an image forming method comprising:

applying an ink that forms an image by inkjetting an ink composition containing coloring particles, a water-soluble polymerizable compound, a polymerization initiator and water onto a recording medium in which a base paper, a first layer containing a binder, and a second layer containing a white pigment are layered in this order, and a Cobb water absorption degree on a surface of the first layer placed on the base paper is 5.0 g/m$^2$ or less as measured by a water absorption degree test according to JIS P8140 with a contact time of 15 seconds, and a water absorption amount on a surface of the second layer is 2 mL/m$^2$ to 8 mL/m$^2$ as measured by a Bristow method with a contact time of 0.5 seconds. The disclosure of JIS P8140 is incorporated by reference herein.

BRIEF DESCRIPTION OF THE DRAWINGS

FIG. 1 is a schematic diagram illustrating an example of the configuration of a recording medium that is related to the invention.

DETAILED DESCRIPTION OF THE INVENTION

According to the invention, a method of forming an image with excellent adhesion to a medium for recording an image to be formed may be provided by suppressing occurrence of a curl and a cockle at the time of forming the image.

<Image Forming Method>

The image forming method of the invention is constituted by including applying an ink to form an image by inkjetting an ink composition containing coloring particles, a water-soluble polymerizable compound, a polymerization initiator and water by an ink jet method on a recording medium in which a base paper, a first layer containing a binder, and a second layer containing a white pigment are sequentially, and a Cobb water absorption degree on a surface of the first layer placed on the base paper is 5.0 g/m$^2$ or less as measured by a water absorption degree test according to JIS P8140 with a contact time of 15 seconds and a water absorption amount on the surface of the second layer is 2 mL/m$^2$ to 8 mL/m$^2$ as measured by a Bristow method with a contact time of 0.5 seconds (herein below, it may be referred to as a "specific recoding medium").

By forming an image with the application of an ink composition containing a water-soluble polymerizable compound on the specific recording medium, an image which has an excellent adhesion to the recording medium and inhibited deformation of the recording medium like curl and cockle at the time of ink application may be formed.

[Ink Applying Step]

According to the ink applying step of the invention, an image is formed by inkjetting an ink composition containing coloring particles, a water-soluble polymerizable compound, a polymerization initiator and water by the ink jet method on the specific recording medium. Further, detailed descriptions regarding the recording medium and ink composition are given below.

(Ink Jet Method)

The recording of an image using an ink jet method is performed by jetting an ink composition onto a recording medium by application of energy to form a color image. Further, as an ink jet recording method that is preferred in the invention, the method described in paragraphs [0093] to [0105] of JP-A No. 2003-306623 may be used.

The ink jet method is not particularly limited and may be any known method such as a charge-control method in which ink is jetted by electrostatic attraction force, a drop-on-demand method (pressure-pulse method) in which a pressure of oscillation of a piezo element is utilized, and an acoustic ink jet method in which ink is jetted by radiation pressure generated by irradiation of ink with acoustic beams that have been converted from electric signals.

The ink jet head used in an ink jet method may be either an on-demand type head or a continuous type head. The ink nozzles used for performing the recording by the ink jet method are not particularly limited, and may be selected as appropriate in accordance with the intended use.

Further, examples of the ink jet method include a method in which a large number of small-volume droplets of an ink having a low density, which is called a photo ink, are jetted, a method in which inks of substantially the same color hue at different densities are used to improve image quality, and a method in which a clear and colorless ink is used.

Further, regarding the ink jet method, there are a shuttle system in which recording is performed while a short serial head is moved in the width direction of a recording medium in a scanning manner, and a line system in which a line head having recording devices that are aligned correspondingly to the entire length of one side of a recording medium is used. In the line system, image recording is performed over the whole of one surface of a recording medium by moving the recording medium in a direction orthogonal to the direction along which the recording devices are aligned, and a conveyance system, such as carriage, which moves the short head in a scanning manner is unnecessary. Further, since a complicated scan-movement control of the movement of the carriage and the recording medium is unnecessary and only the recording medium is moved, the recording speed can be increased compared to the shuttle system.

The amount of ink per one drop jetted from an ink jet head is preferably from 1 pL to 10 pL (pico liter), and more preferably from 1.5 pL to 6 pL, from the view point of obtaining a high definition image. It is also effective to jet liquid droplets of different quantities in combination, with a view to suppressing unevenness in an image and improving smoothness in continuous gradation. The invention is effective also in such an embodiment.

The application amount of the ink composition on the recording medium may be appropriately selected depending on desired image density, etc. From the view points of image adhesion and image density, the maximum application amount of the ink composition is preferably 3 to 30 ml/m$^2$, more preferably 3 to 20 ml/m$^2$, and still more preferably 5 to 15 ml/m$^2$.

[Treatment Liquid Applying Step]

It is preferable that the image forming method of the invention further includes a treatment liquid applying step by which a treatment liquid containing a coagulant, that is able to form an coagulate when the treatment liquid is brought into contact with the ink composition, is applied on the recording medium. By including the treatment liquid applying step, an image with higher definition may be produced at higher speed. Further, detailed description of the treatment liquid is given below.

According to the invention, the order for performing the treatment liquid applying step and the ink applying step is not specifically limited. However, from the view point of image quality, it is preferable to perform the ink applying step after the treatment liquid applying step. Specifically, it is preferable that the ink applying step is to apply the ink composition to the recording medium to which the treatment liquid is already applied.

According to the treatment liquid applying step, the treatment liquid containing a coagulant that is able to coagulate the components in the ink composition is applied onto the recording medium. The application of the treatment liquid onto the recording medium may be performed using a known method without specific limitations, i.e., any method including spray coating, coating using a coating roller, an application based on an ink jet method, or an immersion method may be selected. Detailed description of the ink jet method is the same as given above.

Application may be performed using a known coating method using a bar coater, an extrusion die coater, an air doctor coater, a blade coater, a rod coater, a knife coater, a squeeze coater, a reverse roll coater, or the like.

Furthermore, a method of coating in which the coating amount is controlled using a coating apparatus equipped with a liquid amount controlling member, as in the case of the coating apparatus described in JP-A No. 10-230201, may be used.

The treatment liquid may be supplied over the entire surface of the recording medium. Alternatively, the treatment liquid may be supplied to a region where ink-jet recording has been performed in the ink supplying step. According to the invention, in view of uniformly adjusting the amount of supplying of the treatment liquid, uniformly recording fine lines, fine image portions or the like, and suppressing density unevenness such as image unevenness, it is preferable that the treatment liquid is supplied over the entire surface of the recording medium by coating the liquid using a coating roller or the like.

As for the method of coating the treatment liquid while controlling the amount of supply of the treatment liquid to the above-described range, for example, a method of using an anilox roller may be suitably mentioned. The anilox roller is a roller in which the roller surface, being thermal spray coated with ceramics, is processed with laser and provided with a pattern of a pyramidal shape, a slant-lined shape, a hexagonal shape or the like on the surface. The treatment liquid goes into the depression areas provided on this roller surface, and when the roller surface contacts the paper surface, transfer occurs, and the treatment liquid is coated in an amount that is controlled at the depressions of the anilox roller.

[Actinic Energy Ray Radiating Step]

It is preferable that the image forming method of the invention includes a step of irradiating the ink composition applied on the recording medium with actinic energy ray. With the actinic energy ray radiation, the polymerizable compound included in the ink composition polymerizes to form a cured film in which coloring particles are included. As a result, adhesion, friction resistance and blocking resistance of the image are improved more effectively.

The ink composition jetted onto the recording medium is cured by irradiation with actinic energy ray. This is because the polymerization initiator included in the ink composition of the invention is degraded by irradiation of actinic energy ray, and generates initiation species such as radical, acid and base, which cause and promote a polymerization reaction of the polymerizable compound to cure the ink composition of the invention.

Herein, as actinic energy ray, α ray, γ ray, electronic ray, X ray, UV ray, visible ray, or infrared ray and the like may be used. The wavelength of the actinic energy ray is preferably in the range of 200 to 600 nm, more preferably in the range of 300 to 450 nm, and still more preferably in the range of 350 to 420 nm.

The output of the actinic energy ray is, in terms of accumulated radiation amount, preferably 5000 mJ/cm$^2$ or less, more preferably 10 to 5000 mJ/cm$^2$, still more preferably 10 to 2000 mJ/cm$^2$, and even still more preferably 20 to 2000 mJ/cm$^2$. With the accumulated radiation amount of the actinic energy ray which falls within the range above, adhesion of the image is improved more effectively.

As an actinic energy ray source, a mercury lamp and a gas or solid laser, etc. are mainly used, and as a light source used for UV photocuring type ink jet recording ink, a mercury lamp and a metal halide lamp are widely known. However, from the view point of protection of the environment, there has recently been a strong desire for mercury not to be used, and replacement by a GaN semiconductor UV light emitting device is very useful from industrial and environmental view points. Furthermore, LEDs (UV-LED) and LDs (UV-LD)

have small dimensions, long life, high efficiency, and low cost, and their use as a photocuring type ink jet light source is expected.

Furthermore, light-emitting diodes (LED) and laser diodes (LD) may be used as the source of active radiation. In particular, when a UV ray source is needed, a UV-LED or a UV-LD may be used. For example, Nichia Corporation has marketed a violet LED having a wavelength of the main emission spectrum of between 365 nm and 420 nm.

The actinic energy ray source particularly preferable in the invention is a UV-LED, and a UV-LED having a peak wavelength at 350 to 420 nm is particularly preferable.

[Ink Drying Step]

The image forming method of the invention may include drying and removing an ink solvent (examples thereof including water and water soluble organic solvents) in the ink composition supplied onto the recording medium (ink drying step), as required. The ink drying step is not particularly limited insofar as at least a part of the ink solvent can be removed, and any generally-used method can be applied.

For example, ink drying may be performed by a known heating unit such as heater, an air blowing unit utilizing air blowing such as dryer, or a unit combining these. Examples of the heating method include a method of supplying heat by a heater or the like, from the side of the recording medium opposite to the surface on which the treatment liquid has been applied, a method of blowing a warm air or hot air to the surface of the recording medium on which the treatment liquid has been applied, a method of heating using an infrared heater, or the like. Heating may also be performed by combining these methods.

Further, the ink drying step is performed after the ink applying step, and it may be performed either before or after the actinic energy ray radiating step. According to the invention, from the view points of curing sensitivity and blocking resistance, it is preferably performed before the actinic energy ray radiating step.

Herein below, the recording medium, the ink composition and the treatment liquid, etc. that are used for the image forming method of the invention are explained in greater detail.

[Recording Medium]

The recording medium of the invention includes a base paper, a first layer and a second layer, which are disposed in the order, and if necessary further includes other layers appropriately selected depending on the purpose.

For example, as shown in FIG. 1, a recording medium 100 includes high quality paper 11 serving as a base paper, solvent-blocking layers 12 serving as a first layer, and ink-absorbing layers 13 serving as a second layer, wherein the solvent-blocking layers 12 are formed on the high quality paper 11 and the ink-absorbing layers 13 are formed on the solvent-blocking layers 12.

Also, the recording medium may be any of sheet paper and roll paper.

(Base Paper)

The base paper is not particularly limited and may be appropriately selected from those known in the art in accordance with the intended use.

As for the pulp which may be used as a raw material for the base paper is preferably broad-leaf bleached kraft pulp (LBKP) from the view points of simultaneously increasing the surface smoothness, rigidity and dimensional stability (curling property) to satisfactory levels. However, needle-leaf bleached kraft pulp (NBKP) and broad-leaf bleached sulfite pulp (LBSP), etc. may be also used.

The pulp may be beaten using a beater or a refiner. If necessary, various additives are added to a pulp slurry formed after beating of the pulp (hereinafter, it may be referred to as a "pulp paper material"). Examples of the additives include fillers, dry paper strengthening agents, sizing agents, wet paper strengthening agents, fixing agents, pH adjusting agents and other agents.

Examples of the fillers include calcium carbonate, clay, kaolin, white clay, talc, titanium oxide, diatomaceous earth, barium sulfate, aluminum hydroxide and magnesium hydroxide. Examples of the dry paper strengthening agents include cationic starches, cationic polyacrylamides, anionic polyacrylamides, amphoteric polyacrylamides and carboxy-modified polyvinyl alcohols. Examples of the sizing agents include fatty acid salts, rosin, rosin derivatives (e.g., maleic rosin), paraffin waxes, alkyl ketene dimers, alkenyl succinic anhydrides (ASA) and epoxidized fatty acid amides.

Examples of the wet paper strengthening agents include polyamine polyamide epichlorohydrin, melamine resins, urea resins and epoxidized polyamide resins. Examples of the fixing agents include polyvalent metal salts like aluminum sulfate and aluminum chloride and cationic polymers like cationic starches. Examples of the pH adjusting agents include caustic soda and sodium carbonate.

Examples of the other agents include defoamers, dyes, slime control agents and fluorescent whitening agents. If necessary, a softening agent may be also added. Examples of the softening agents include those described in, for example, "New edition-Paper and Paper Treatment Manual (published by SHIGYO TIMES, 1980) (pp. 554 to 555)."

A treatment liquid used for the surface sizing treatment may contain a water-soluble polymer, a sizing agent, a water resistant compound, a pigment, a pH adjusting agent, a dye and a fluorescent whitening agent, etc. Examples of the water-soluble polymer include cationic starches, polyvinyl alcohols, carboxy-modified polyvinyl alcohols, carboxymethyl cellulose, hydroxyethyl cellulose, cellulose sulfate, gelatin, casein, sodium polyacrylates, sodium salts of styrene-maleic anhydride copolymers and sodium polystyrene sulfonates.

Examples of the sizing agent include petroleum resin emulsions, ammonium salts of styrene-maleic anhydride copolymer alkyl esters, rosin, higher fatty acid salts, alkyl ketene dimers (AKD) and epoxidized fatty acid amides.

Examples of the water resistant compound include latexes or emulsions of styrene-butadiene copolymers, ethylene-vinyl acetate copolymers, polyethylenes, vinylidene chloride copolymers, etc., and polyamide polyamine epichlorohydrin.

Examples of the pigment include calcium carbonate, clay, kaolin, talc, barium sulfate and titanium oxide. Examples of the pH adjusting agent include hydrochloric acid, caustic soda and sodium carbonate.

Examples of the base paper include natural pulp paper formed of the aforementioned pulp, synthetic pulp paper, mixed paper formed of natural pulp and synthetic pulp, and various combination papers. The base paper has a thickness of, for example, 30 μm to 500 μm, preferably 50 μm to 300 μm, and more preferably 70 μm to 200 μm.

(First Layer)

The first layer is not particularly limited, so long as it contains a binder and has a Cobb water absorption degree of 5.0 g/m$^2$ or less as measured by the water absorption degree test stipulated in JIS P8140 with a contact time of 15 seconds, and may be appropriately selected from those known in the art depending on the purpose. Herein, the water absorption degree test stipulated in JIS P8140 for the base paper on which the first layer is formed is carried out on the surface side of the first layer placed on the base paper that is opposite to the side facing the base paper.

For example, the base paper on which the first layer has been formed has a Cobb water absorption degree of 2.0 g/m$^2$ or less as measured by the water absorption degree test stipulated in JIS P8140 with a contact time of 2 minutes, the base paper on which the first layer has been formed has a Cobb value of 5.0 g/m$^2$ or less as measured by the water absorption degree test stipulated in JIS P8140 using diethylene glycol instead of water with a contact time of 2 minutes, the first layer contains, as a binder, at least one of a thermoplastic resin and a polyvinyl alcohol (in particular, an acetoacetyl modified polyvinyl alcohol with a polymerization degree of 1,000 or more is preferred), the first layer further contains an layered inorganic compound, the first layer containing both polyvinyl alcohol and an layered inorganic compound in which the ratio of the mass of polyvinyl alcohol (X) to the mass of water-swellable synthetic mica serving as the layered inorganic compound (Y), i.e., X/Y, is 1 to 30, the first layer further containing a hardener, and the first layer further containing a white pigment are preferable.

When the base paper on which a solvent-blocking layer (first layer) has been formed has a Cobb water absorption degree of more than 5.0 g/m$^2$ as measured according to the water absorption degree test stipulated in JIS P8140 with a contact time of 15 seconds, there may be a case in which reduction of paper strength and deformation due to swelling cannot be satisfactorily prevented.

On the other hand, when it has a Cobb water absorption degree of 2.0 g/m$^2$ or less as measured according to the water absorption degree test stipulated in JIS P8140 with a contact time of 2 minutes and has a Cobb value of 5.0 g/m$^2$ or less as measured using diethylene glycol according to the procedure of JIS P8140 with a contact time of 2 minutes, reduction of paper strength and deformation due to swelling (for example, curl and cockle) may be almost completely prevented.

Specific solution for the above is that a coating liquid mainly containing a water dispersible latex, which has been prepared by dispersing a water-insoluble or poorly water-soluble hydrophobic polymer in an aqueous dispersion in the form of microparticles, is coated on base paper in a solid amount of 3 g/m$^2$ to 20 g/m$^2$ per one surface, and as a result almost complete water resistance is obtained.

Also, in order for the resin surface to have hydrophilicity; i.e., not to repel water, a white pigment is incorporated to form the solvent-blocking layer described below in an amount of 5 parts by mass to 50 parts by mass per 100 parts by mass of the binder. The obtained base paper on which the first layer has been formed exhibits sufficient water resistance and allows easy coating of the second layer.

Further, by using the white pigment with an aspect ratio of 30 or more as a white pigment, the amount thereof may be increased to 200 parts by mass per 100 parts by mass of the binder. Moreover, use of such a white pigment allows not only easy coating of the second layer but also excellent handleability, among others, excellent cleaning performance.

—Binder—

The binder contained in the first layer is not particularly limited, so long as the layer contains at least one of a thermoplastic resin and a polyvinyl alcohol. Preferably, it contains a thermoplastic resin.

—Thermoplastic Resin—

The thermoplastic resin is not particularly limited, and may be appropriately selected from known thermoplastic resins such as polyolefin resins (e.g., homopolymers of α-olefins such as polyethylene and polypropylene; and mixtures of the homopolymers) and latexes of the thermoplastic resins. Of these, preferred are the latexes such as polyester urethane latexes, acrylic latexes, acrylic silicone latexes, acrylic epoxy latexes, acrylic styrene latexes, acrylic urethane latexes, styrene-butadiene latexes, acrylonitrile-butadiene latexes and vinyl acetate latexes, and at least one selected therefrom is preferably used. Among these, in particular, at least one selected from polyester urethane latexes and acrylic silicone latexes is preferably used.

Examples of the polyester urethane latexes include HYDRAN AP series and HYDRAN ECOS series (trade name) manufactured by Dainippon Ink and Chemicals, Inc.

The aforementioned acrylic latexes may be commercially available products. For example, water dispersible latexes described below may be used. Examples of the acrylic resin include "CEVIAN A4635, 46583 and 4601" (trade name) manufactured by Daicel Chemical Industries, Ltd. and "NIPOL Lx 811, 814, 821, 820 and 857" (trade name) manufactured by Zeon Corporation.

Particularly, acrylic emulsions of acrylic silicone latexes as described in JP-A Nos. 10-264511, 2000-43409, 2000-343811 and 2002-120452 (specifically, for example, commercially available "AQUABRID SERIES UM7760, UM7611, UM4901, MSi-045, ASi-753, ASi-903, ASi-89, ASi-91, ASi-86, 4635, MSi-04S, AU-124, AU-131, AEA-61, AEC-69 and AEC-162" (trade name), manufactured by Daicel Chemical Industries, Ltd.) may be suitably used.

The above thermoplastic resins may be used singly or in combination of two or more types.

The thermoplastic resin preferably has a glass transition temperature (Tg) of 5° C. to 70° C., particularly preferably 15° C. to 50° C. By having the Tg of this range, difficulty in handling during production caused by problems by coagulates generation of the first layer-forming liquid (e.g., coating liquid) may be avoided. Further, problems including the impossibility to obtain desired glossiness without having significantly high calender temperature as the Tg is too high and the deterioration of the surface state as having high adherence on a surface of a metal roll are not caused, and therefore high glossiness and high smoothness may be easily obtained.

The thermoplastic resin preferably has a minimum film forming temperature of 20° C. to 60° C., more preferably 25° C. to 50° C. By adjusting the minimum required temperature for film formation to fall within the above range, the first layer-forming liquid (e.g., coating liquid) does not involve any difficulties in handling (e.g., burr generation) during production, during formation of the second layer, the surface conditions of the formed second layer are not deteriorated due to higher infiltration, and a desired microporous layer may be formed which allows the ink solvent to rapidly permeate. The layer obtained after coating of the liquid (e.g., coating liquid) does not exhibit excellent glossiness, however, by performing later a calender treatment, a highly glossy layer with microporosity is obtained.

The thermoplastic resin content in the first layer is preferably 15% by mass to 95% by mass, more preferably 30% by mass to 90% by mass compared to the solid content of the first layer. When the content is adjusted to fall within the above range, without impairing glossiness and smoothness after performing a calendering treatment, sufficient ink-solvent permeability is obtained to effectively prevent ink bleeding occurring over time.

—Polyvinyl Alcohol—

Polyvinyl alcohol includes, in addition to ordinary polyvinyl alcohol (PVA), cation modified polyvinyl alcohol, anion polyvinyl alcohol, silanol modified polyvinyl alcohol, acetoacetyl modified polyvinyl alcohol and other polyvinyl alcohol derivatives. The polyvinyl alcohol may be used singly or in combination of two or more types. Among these, polyvinyl alcohol and acetoacetyl modified polyvinyl alcohol may be preferably used.

According to the invention, the saponification degree of the polyvinyl alcohol is preferably 70% to 99%, and more preferably 85% to 99%. Further, the polymerization degree is preferably 1000 to 4500, and more preferably 1500 to 4500. By adjusting the saponification degree and the polymerization degree to the range above, sufficient strength and elongation property of the film may be obtained.

—Cobb Water Absorption Degree—

The Cobb water absorption degree is measured by the water absorption degree test that is stipulated in JIS P8140. In this test, one surface of paper is brought into contact with water in a predetermined time, and the amount of water absorbed by the paper is measured. Further, the contact time was set to 15 seconds or 2 minutes.

Further, according to the invention, the water absorption degree measurement was carried out on the surface side of the first layer placed on the base paper that is opposite to the side facing the base paper.

—Cobb Value—

The Cobb value is measured by using diethylene glycol instead of water and having contact time of 2 minutes based on the procedure of the water absorption degree test stipulated in JIS P8140. In this measurement, one surface of paper is brought into contact with diethylene glycol in a predetermined time, and the amount of diethylene glycol absorbed by the paper is measured.

Further, according to the invention, the diethylene glycol liquid absorption amount measurement was carried out on the surface side of the first layer placed on the base paper that is opposite to the side facing the base paper.

—Layered Inorganic Compound—

Preferably, the first layer further contains a layered inorganic compound. Preferred examples of the layered inorganic compound include swellable layered inorganic compound such as swellable clay minerals like bentonite, hectorite, saponite, bidelite, nontronite, stivensite, beidellite and montmorillonite, swellable synthetic mica and swellable synthetic smectite. These swellable layered inorganic compounds have a laminated structure formed of unit crystal lattice layers with a thickness of 1 nm to 1.5 nm, and the degree of metal atom substitution in the lattice is markedly greater as compared with other clay minerals. As a result, a shortage of positive charges in the lattice layer arises and, in order to compensate for the shortage, $Na^+$, $Ca^{2+}$, $Mg^{2+}$ and other cations are adsorbed between the layers. These cations disposed between the layers, called exchangeable cations, may be exchanged with various cations. In particular, when the cations between the layers are $Li^+$, $Na^+$ and other ions, due to a small ion radius, bonding between the laminated crystal lattice is weak and it is significantly swelled with water. In this state, cleavage easily occurs when shearing force is applied, forming a stable aqueous sol. Bentonite and swellable synthetic mica strongly exhibit such behavior and are preferable in view of the objects of the invention. In particular, water-swellable synthetic mica is preferable.

Examples of the water-swellable synthetic mica include Na-tetrasilicic mica ($NaMg_{2.5}(Si_4O_{10})F_2Na$), Li-taeniolite ($(NaLi)Mg_2(Si_4O_{10})F_2Na$) and Li-hectorite ($(NaLi)/3Mg_2/3Li_{1/3}(Si_4O_{10})F_2$).

The water-swellable synthetic mica preferably used in the invention has a thickness of 1 nm to 50 nm and a surface size of 1 μm to 20 μm. From the view point of desirably controlling its diffusion, the thickness is preferably smaller to the greatest extent possible; and the surface size is preferably larger to the greatest extent possible, so long as it falls within such a range that the surface smoothness and transparency of the coated layer are not deteriorated. Thus, the aspect ratio is preferably 100 or more, more preferably 200 or more, and particularly preferably 500 or more.

—Mass Ratio—

In the first layer, the ratio of the mass of the acetoacetyl modified polyvinyl alcohol (X) to the mass of the water-swellable synthetic mica (Y), i.e., X/Y, is preferably 1 to 30, more preferably 5 to 15. When the mass ratio falls within a range of 1 to 30, oxygen permeation and blister formation may be effectively prevented.

—Hardener—

The hardener contained in the first layer in the invention is characterized by being at least one selected from aldehyde compounds; 2,3-dihydroxy-1,4-dioxane and derivatives thereof; and compounds having, in one molecule thereof, two or more vinyl groups neighboring substituents with a positive Hammett's substituent constant $\sigma_p$. By having at least one selected from aldehyde compounds; 2,3-dihydroxy-1,4-dioxane and derivatives thereof; and compounds having, in one molecule thereof, two or more vinyl groups neighboring substituents with a positive Hammett's substituent constant $\sigma_p$ as a hardener in the first layer of the invention, it reacts with the acetoacetyl modified polyvinyl alcohol, enhancing water resistance of the formed recording medium without thickening the first layer coating liquid. As a result, a recording medium which has improved water resistance and in which the first layer coating liquid is more stably coated is obtained.

Examples of the substituents with a positive Hammett's substituent constant $\sigma_p$ include a $CF_3$ group ($\sigma_p$ value: 0.54), a CN group ($\sigma_p$ value: 0.66), a $COCH_3$ group ($\sigma_p$ value: 0.50), a COOH group ($\sigma_p$ value: 0.45), a COOR (R represents an alkyl group) group ($\sigma_p$ value: 0.45), an $NO_2$ group ($\sigma_p$ value: 0.78), an $OCOCH_3$ group ($\sigma_p$ value: 0.31), an SH group ($\sigma_p$ value: 0.15), an $SOCH_3$ group ($\sigma_p$ value: 0.49), an $SO_2CH_3$ group ($\sigma_p$ value: 0.72), an $SO_2NH_2$ group ($\sigma_p$ value: 0.57), an $SCOCH_3$ group ($\sigma_p$ value: 0.44), an F group ($\sigma_p$ value: 0.06), a Cl group ($\sigma_p$ value: 0.23), a Br group ($\sigma_p$ value: 0.23), an I group ($\sigma_p$ value: 0.18), an $IO_2$ group ($\sigma_p$ value: 0.76), an $N^+(CH_3)_2$ group ($\sigma_p$ value: 0.82), and an $S^+(CH_3)_2$ group ($\sigma_p$ value: 0.90).

Examples of the compounds having, in one molecule thereof, two or more vinyl groups neighboring substituents with a positive Hammett's substituent constant include 2-ethylenesulfonyl-N-[2-(2-ethylenesulfonyl-acetylamino)-ethyl]acetamide, bis-2-vinylsulfonyl ethyl ether, bisacryloylimide, N,N'-diacryloylurea, 1,1-bisvinylsulfone ethane, ethylene-bis-acrylamide, and also diacrylate compounds and dimethacrylate compounds that are represented by the following structural formula. Among them, 2-ethylenesulfonyl-N-[2-(2-ethylenesulfonyl-acetylamino)-ethyl]acetamide is particularly preferred.

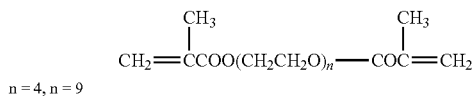

n = 4, n = 9

In the first layer, the amount of the compounds having, in one molecule thereof, two or more vinyl groups neighboring substituents with a positive Hammett's substituent constant $\sigma_p$ is preferably 0.1% by mass to 30% by mass, more preferably 0.5% by mass to 10% by mass, with respect to the polyvinyl alcohol. When the amount is 0.5% by mass to 10% by mass with respect to the polyvinyl alcohol, the water resistance of the formed recording medium may be effectively increased without thickening the first layer coating liquid. As a result, the effect aimed by using the above compounds in the invention may be exhibited.

—White Pigment—

Examples of the white pigment include titanium oxide, barium sulfate, barium carbonate, calcium carbonate, lithopone, alumina white, zinc oxide, silica, antimony trioxide, titanium phosphate, aluminum hydroxide, kaolin, clay, talc, magnesium oxide and magnesium hydroxide. These may be used singly or in combination of two or more types. Among these, kaolin is particularly preferred.

—Kaolin—

Kaolin preferably has an aspect ratio (diameter/thickness) of 30 or more. Examples of kaolin with an aspect ratio of 30 or more include engineered grade kaolin (e.g., Contour 1500 (aspect ratio: 59) and Astra-Plate (aspect ratio: 34)). When kaolin has high whiteness and a steep particle size distribution (uniform particle diameter), the recording medium is provided with excellent whiteness and printing suitability.

Regarding the particle size of the white pigment, 75% or more of the white pigment preferably have a particle diameter of 2 μm or less and also the average particle diameter is preferably 0.1 μm to 0.5 μm. By specifically having the particle size of this range, decrease in whiteness or decrease in glossiness may be effectively avoided.

The titanium oxide may be any one of rutile or anatase type. They may be used singly or in combination. Also, the titanium oxide may be produced through the sulfate process or the chloride process. The titanium oxide may be appropriately selected from those subjected to a surface coating treatment with an inorganic compound such as hydrous alumina, hydrous silicon dioxide or zinc oxide; those subjected to a surface coating treatment with an organic compound such as trimethylol methane, trimethylol ethane, trimethylol propane or 2,4-dihydroxy-2-methylpentane; and those treated with siloxane such as polydimethylsiloxane.

The white pigment preferably has a refractive index of 1.5 or higher. By including the white pigment having the refractive index within the range described above, an image with high quality may be obtained.

Also, the white pigment preferably has a specific surface area less than 100 $m^2/g$ as measured by the BET method. By including the white pigment having the specific surface area of this range, infiltration of a coating liquid to form a coating and forming a second layer is inhibited, resulting in enhancing ink-absorbability of the second layer.

Here, the BET method is a surface area measuring method for powder through the vapor-phase adsorption process. In this method, the overall surface area of a sample of 1 g (i.e., specific surface area) is determined from an adsorption isotherm curve thereof. Usually, nitrogen gas is used as an adsorption gas. The amount of gas adsorbed by the sample is generally measured based on a change in pressure or volume of the gas. The most famous equation representing an isotherm curve for multimolecular adsorption is the Brunauer Emmett, Teller equation (i.e., BET equation). The adsorption amount is calculated from this equation, and the obtained value is multiplied by the area occupied with one adsorption molecule for determining the surface area.

The white pigment content in the first layer varies with the types of the white pigment and the thermoplastic resin, and the layer thickness. In general, it is preferably about 50 parts by mass to about 200 parts by mass per 100 parts by mass of the thermoplastic resin.

Further, the first layer may contain known additives such as an antioxidant.

The thickness of the first layer formed from the composition therefor is preferably 1 μm to 30 μm, and more preferably 5 μm to 20 μm. When the layer thickness is adjusted to fall within the above range, the layer surface having undergone calendering exhibits high glossiness. In addition, the surface may be provided with whiteness by using even a small amount of the white pigment and it may be comparable to a coat paper or an art paper in handleability such as a folding property. Another advantageous effect given by incorporating the white pigment into the first layer is that adhesion to a calender may be prevented during calendaring after coating of the first layer.

(Second Layer)

The second layer is not particularly limited, so long as it contains a white pigment and has a water absorption amount of 2 $mL/m^2$ to 8 $mL/m^2$ as measured by the Bristow method with a contact time of 0.5 seconds, and may be selected from those known in the art depending on the purpose. Preferably, for example, the second layer has a liquid absorption amount of 1 $mL/m^2$ to 6 $mL/m^2$ as measured by the Bristow method using a liquid containing 30% by mass of diethylene glycol in pure water with a contact time of 0.9 seconds, the second layer further containing a binder, the second layer containing 10 parts by mass to 60 parts by mass of a thermoplastic resin compared to 100 parts by mass of the white pigment in solid content, and the second layer of which film surface pH is acidic are preferable.

Further, according to the invention, measurement of the liquid absorption amount on the surface of the second layer is performed by the Bristow method on the surface side of the second layer that is opposite to the side of the first layer.

When the second layer has a water absorption amount of more than 8 $mL/m^2$ as measured by the Bristow method with a contact time of 0.5 seconds, the recording medium exhibits a high ink-solvent absorbing speed, causing poor coagulation in the vicinity of the surface. As a result, when a fixing roller is used for example, an ink is transferred onto a fixing roller, causing smear on the printed products.

Further, when the water absorption amount is less than 2 $mL/m^2$, the solvent is enclosed during coagulation of an ink, causing problematic image deformation.

Further, when the liquid absorption amount is more than 6 $mL/m^2$ as measured by the Bristow method with a liquid containing 30% by mass diethylene glycol in pure water almost equivalent to an actually used ink with a contact time of 0.9 seconds, the same problem as described above arises; i.e., smear on the printed product is caused. When the liquid absorption amount is less than 1 $mL/m^2$, a problem of image deformation is caused.

Specific solution for allowing the second layer to have a water absorption amount of 2 $mL/m^2$ to 8 $mL/m^2$ as measured by the Bristow method with a contact time of 0.5 seconds, preferably, to have a liquid absorption amount of 1 $mL/m^2$ to 6 $mL/m^2$ as measured by the Bristow method using a liquid containing 30% by mass diethylene glycol in pure water with a contact time of 0.9 seconds is that the binder content of the second layer is adjusted to 5 parts by mass to 15 parts by mass per 100 parts by mass of the white pigment.

—White Pigment—

The white pigment is not particularly limited and may be selected from those generally used as a white pigment in printing coat paper; e.g., calcium carbonate, kaolin, titanium dioxide, aluminum trihydroxide, zinc oxide, barium sulfate, satin white and talc. An advantageous effect given by incorporating the white pigment into the second layer is that pigment particles included in the ink composition may be retained in the second layer.

It is preferable that the white pigment consists only of a white pigment which has pH of less than 8.0 (preferably 7.5 or less) according to the pH value test method (room temperature extraction method) stipulated in JIS K5101. If pH is more than 8.0, surface pH of the second layer increases, and image bleed and reduction in image quality may be caused by deformation of liquid droplets which fall after spotting. It may be considered that, for example, as typical coloring particles in the ink composition have anionic charges (i.e., anionic dissociating group), dispersion of the coloring particles is relatively stable so that aggregation of the coloring particles is not likely to occur.

Further, the white pigment has pH of less than 6.0 (preferably 5.0 or less, and more preferably 4.0 or less) after 0.1 mL of hydrochloric acid (1 mol/L) is added to 10 g of a measurement liquid according to the pH value test method stipulated in JIS K5101. If the pH is less than 6.0, increase in surface pH of the second layer is inhibited so that image blur and image quality are improved. Further, if pH of the second layer is adjusted low to promote aggregation of coloring particles by using an acidic material, etc., the white pigment is neutralized and the increase in surface pH is inhibited so that pH adjusting effect is improved and image blur and reduction in image quality may be effectively inhibited.

Examples of the pigment include kaolin, titanium oxide, and a mixture of kaolin and titanium oxide.

Content of the white pigment in the second layer is preferably 50% by mass to 98% by mass, and more preferably 70% by mass to 97% by mass.

—Bristow Method—

The Bristow method is the most popular method for measuring the absorption amount of liquid in short time, and is adopted by the Japan Technical Association of the Pulp and Paper Industry (J'TAPPI). It is described in detail in J'TAPPI No. 51 "Kami, Itagamino Ekitai Kyushusei Shiken Houhou (Test Method for Liquid Absorbability of Paper and Paper Board)." At the time of measurement, the width of a head box slit in the Bristow method is adjusted depending on the surface tension of an ink. Further, the points where the test liquid is leaked from the back surface of paper are not taken into account.

—Binder (Thermoplastic Resin)—

The second layer preferably includes at least one binder (thermoplastic resin). The binder (thermoplastic resin) is not particularly limited and may be, for example, the same as those used in the first layer. Content of the binder in the second layer is preferably 2 parts by mass to 50 parts by mass, and more preferably 3 parts by mass to 30 parts by mass compared to 100 parts by mass of the white pigment.

—Layer Surface pH—

By adjusting the layer surface pH of the second layer to be acidic, ink is coagulated and ink fixing may be improved.

The layer surface pH of the second layer is preferably less than 8.0, and more preferably 7.5 or less before pH adjustment. By having pH of less than 8.0 for the layer surface before the pH adjustment, image blur and reduction in image quality may be inhibited. Further, when pH of the second layer is adjusted low by using an acid, etc. to promote aggregation of a coloring material, the white pigment is neutralized and the increase in surface pH is inhibited so that pH adjusting effect is improved and image blur and reduction in image quality may be inhibited.

Further, the layer surface pH of the second layer is preferably 5.5 or less, and more preferably 4.5 or less after pH adjustment. If the layer surface pH is 5.5 or less after pH adjustment, image blur and reduction in image quality may be inhibited.

The surface pH may be measured by Method A (coating method) stipulated in the Japan Technical Association of the Pulp and Paper Industry (J. TAPPI). Specifically, for example, it may be measured using a "pH Indicator Set for Surface of Paper" (model MPC, manufactured by KYORITSU CHEMICAL-CHECK Lab., Corp.), which corresponds to Method A.

The pH adjustment may be carried out by adding an acidic material to a coating liquid for the second layer or by adding an acidic material to the surface of the recording medium. However, it is preferably carried out by adding an acidic material to the surface of the recording medium. Specifically, it is preferably carried out by adding a treatment liquid containing an acidic material to the surface of the recording medium.

Examples of the acidic material include a compound which contains a phosphoric acid group, a phosphonic acid group, a phosphinic acid group, a sulfuric acid group, a sulfonic acid group, a sulfinic acid or a carboxylic acid, and salts thereof, and a compound containing a phosphoric acid group, a sulfonic acid group or a carboxylic acid is more preferred.

Examples of the phosphoric acid group-containing compound include phosphoric acid, polyphosphoric acid, metaphosphoric acid, derivatives of thereof and salts thereof. Examples of the sulfonic acid-containing compound include methane sulfonic acid, polysulfonic acid, derivatives of thereof and salts thereof. Examples of the carboxylic acid-containing compound include oxalic acid, tartaric acid, malic acid, malonic acid, citric acid, fumaric acid, maleic acid, succinic acid, salicylic acid, phthalic acid, lactic acid, acetic acid, trichloroacetic acid, chloroacetic acid, polyacrylic acid, derivatives of thereof and salts thereof. Further, examples include the compounds having a carboxy group as a functional group and having a structure of furan, pyrrole, pyrroline, pyrrolidone, pyrone, thiophene, indole, pyridine or quinoline like pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives thereof and salts thereof. Further, an inorganic acid like hydrochloric acid, sulfuric acid and nitric acid may be also used.

(Other Layers)

The other layers for the recording medium are not particularly limited and may be appropriately selected in accordance with the intended use.

[Method of Manufacturing a Recoding Medium]

The recording medium of the invention may be manufactured by a method that is generally used. For example, the recording medium of the invention may be manufactured in view of the manufacturing method described in paragraphs [0076] to [0087] of JP-A No. 2009-73158.

[Ink Composition]

The ink composition of the invention is constituted by containing at least one type of coloring particles, at least one type of a water-soluble polymerizable compound, at least one type of a polymerizable compound and water, and other component, if necessary.

(Coloring Particles)

A well known dye, pigment and the like may be used as the coloring particles without specific limitations. Among these, from the view point of ink coloring property, a coloring material which is poorly soluble or insoluble in water is preferable. Specific examples include various pigments, dispersion dyes, oil-soluble dyes, coloring dyes which form a j-aggregate. In addition, pigments are more preferable from the view point of light resistance.

The pigment according to the invention is not particularly limited in the type, and conventionally known organic and inorganic pigments may be used.

Specific examples of the organic pigments include azo pigments, polycyclic pigments, dye chelate, nitro pigments, nitroso pigments and aniline black. Among these, azo pigments and polycyclic pigments are more preferred. Examples of the azo pigments include azo lake, insoluble azo pigments, condensed azo pigments and chelate azo pigments. Examples of the polycyclic pigments include phthalocyanine pigments, pherylene pigments, perinone pigments, anthraquinone pigments, quinacridone pigments, dioxazine perinone pigments, indigo pigments, thioindigo pigments, isoindoline pigments and quinophthalone pigments. Examples of the pigment chelates include basic pigment type chelate and acidic pigment type chelate.

Further, examples of the inorganic pigments include titanium oxide, iron oxide, calcium carbonate, barium sulfate, aluminum hydroxide, barium yellow, cadmium red, chrome yellow, and carbon black. Among these, carbon black is particularly preferable. In addition, examples of the carbon black include those prepared by a known method like contact method, furnace method, or thermal method.

Specific examples of the pigments that may be used for the invention include the pigment described in paragraphs [0142] to [0145] in JP-A No. 2007-100071.

Further, when a dye is used as a coloring material for the invention, a dye supported on a water-insoluble carrier may be used. As for the dye, a well known dye may be used without specific limitations. For example, the dyes disclosed in JP-A No. 2001-115066, JP-A No. 2001-335714 and JP-A No. 2002-249677, etc. may be appropriately used for the invention. Further, the carrier is not specifically limited it if is insoluble or poorly soluble in water, and an inorganic material, an organic material and their complex materials may be used. Specifically, the carrier disclosed in JP-A No. 2001-181549 and JP-A No. 2007-169418, etc. may be appropriately used for the invention.

The carrier (coloring material) which supports the dye may be used as it is or may be used in combination of a dispersant, if necessary. As for the dispersant, the dispersant described below may be suitable used.

The pigments may be used singly or two or more types of the pigments may be used in combination within each group or among the groups described above.

The content of the coloring particles (in particular, pigments) is preferably from 1% by mass to 25% by mass, and more preferably from 5% by mass to 20% by mass based on the total weight of the ink composition, from the view point of color density, graininess, ink stability and ejection reliability.

—Dispersant—

When the coloring particles of the invention include a pigment, it preferably constitutes the coloring particles that are dispersed in an aqueous solvent with the help of a dispersant. As for the dispersant, a polymer dispersant or a low molecular surface active dispersant may by used. Further, the polymer dispersant may be any one of the water-soluble polymer dispersant and the water-insoluble polymer dispersant.

From the view points of dispersion stability and ejection property when applied to an ink jet method, the water-insoluble polymer dispersant is preferable in the invention.

—Water-Insoluble Polymer Dispersant—

The water-insoluble polymer dispersant (hereinafter, it may be simply referred to as "dispersant") according to the invention is not particularly limited so long as it is a water-insoluble polymer and is capable of dispersing a pigment, and conventionally known water-insoluble polymer dispersants may be used. The water-insoluble polymer dispersant may be constituted to include both a hydrophobic constituent unit and a hydrophilic constituent unit, for example.

The monomer which constitutes the hydrophobic constituent unit may be a styrene-based monomer, an alkyl(meth)acrylate, an aromatic group-containing (meth)acrylate, or the like.

The monomer which constitutes the hydrophilic constituent unit is not particularly limited so long as it is a monomer containing a hydrophilic group. The hydrophilic group may be a nonionic group, a carboxy group, a sulfonate group, a phosphonate group, or the like. Further, examples of the nonionic group include a hydroxyl group, an amide group (of which nitrogen atom is not substituted), a group derived from an alkylene oxide polymer (for example, polyethylene oxide and polypropylene oxide, etc.) and a group derived from sugar alcohols.

The hydrophilic constituent unit according to the invention preferably contains at least a carboxy group from the view point of dispersion stability, and the structure containing both a nonionic group and a carboxy group is also preferable.

Specific examples of the water-insoluble polymer dispersant in the invention include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol(meth)acrylate-(meth)acrylic acid copolymer, and a styrene-maleic acid copolymer.

Here, the "(meth)acrylic acid" refers to acrylic acid or methacrylic acid.

In the invention, the water-insoluble polymer dispersant is preferably a vinyl polymer containing a carboxy group from the viewpoint of dispersion stability of pigments, and more preferably a vinyl polymer at least containing a constituent unit derived from an aromatic group-containing monomer as a hydrophobic constituent unit and a constituent unit containing a carboxy group as a hydrophilic constituent unit.

The weight average molecular weight of the water-insoluble polymer dispersant is preferably from 3,000 to 200,000, more preferably from 5,000 to 100,000, still more preferably from 5,000 to 80,000, and particularly preferably from 10,000 to 60,000 from the viewpoint of dispersion stability of pigments.

The content of the dispersant in a coloring material in the invention is preferably from 10 to 100% by mass, more preferably from 20 to 70% by mass, and particularly preferably from 30 to 50% by mass relative to the pigment from the viewpoint of dispersibility of pigments, ink coloring properties, and dispersion stability.

When the content of the dispersant in the coloring particles is in the range described above, the pigment may tend to be covered with a suitable amount of dispersant and coloring particles having a small particle diameter and excellent stability over time may tend to be easily obtained.

The coloring particles in the invention may further contain additional dispersant(s) in addition to the water-insoluble polymer dispersant. Examples of the additional dispersant that may be used include known water-soluble low-molecular dispersants, and water-soluble polymers. The content of the additional dispersants other than the water-insoluble polymer dispersant may be, for example, in the above-described range of the content of the dispersant.

From the view points of dispersion stability and ejection property, the coloring particles of the invention are preferably constituted by having the pigment and the water-insoluble polymer dispersant, and it is preferable that at least part of the surface of the pigment is coated with a water-insoluble polymer dispersant. The coloring particles may be obtained as a dispersion of coloring particles which is obtained by dispersing a mixture containing pigments, a dispersant, and a solvent or the like, if necessary (preferably, an organic solvent), using a dispersing apparatus.

The dispersion of coloring particles according to the invention may be produced as a dispersion by adding an aqueous solution containing a basic material to a mixture of the pigment, water-insoluble polymer dispersant and an organic solvent which dissolves or disperses the dispersant (mixing and hydration process) followed by excluding the organic solvent (solvent removal process). Accordingly, the coloring particles are finely dispersed, and thus a dispersion of coloring particles having excellent storage stability may be produced.

The organic solvent needs to be able to dissolve or disperse the dispersant, however in addition to this, it is preferable that the solvent has a certain degree of affinity to water. Specifically, the solubility in water is preferably 10% by mass to 50% by mass at 20° C.

The dispersion of coloring particles may be produced more particularly by a production method including a process (1) and a process (2) shown below, but the method is not limited to this.

Process (1): a process of dispersion treating a mixture containing a pigment, a dispersant, an organic solvent which dissolves or disperses the dispersant as well as a basic substance, having water as a main component.

Process (2): a process of removing at least a portion of the organic solvent from the mixture after the dispersion treatment.

In the process (1), first, the dispersant is dissolved or dispersed in the organic solvent, to obtain such a mixture (mixing process). Subsequently, a solution containing a coloring material and a basic substance and containing water as a main component, as well as water and if necessary, a surface active agent or the like, are added to the mixture, and the mixture is mixed and dispersed, to obtain an oil-in-water type dispersion of coloring particles.

The alkali material is used for neutralization of an anionic group (preferably, carboxylic group) which may be contained in the polymer. The degree of neutralization for the anionic group is not particularly limited. Usually, it is preferable that the liquid property of the finally obtained dispersion of the coloring particles has pH of 4.5 to 10, for example. The pH may be determined by the degree of neutralization required for the polymer.

Preferable examples of the organic solvent include alcohol-based solvents, ketone-based solvents, and ether-based solvents. Among these, examples of the alcohol-based solvents include ethanol, isopropanol, n-butanol, tertiary butanol, isobutanol, diacetone alcohol, and the like. Examples of the ketone-based solvents include acetone, methyl ethyl ketone, diethyl ketone and methyl isobutyl ketone. Examples of the ether-based solvents include dibutyl ether, tetrahydrofuran and dioxane. Among these solvents, isopropanol, acetone and methyl ethyl ketone are preferable, and particularly, methyl ethyl ketone is preferable. These organic solvents may be used individually, or in combination of several types.

In the production of the dispersion of coloring particles, the kneading dispersion treatment may be carried out using a double roll, a triple roll, a ball mill, a throne mill, a Disper, a kneader, a co-kneader, a homogenizer, a blender, a single-screw or twin-screw extruder, or the like, while applying a strong shear force. In addition, the details of the kneading and dispersion are described in T. C. Patton, "Paint flow and Pigment Dispersion" (1964, published by John Wiley and Sons, Inc.), and the like.

Further, if necessary, the dispersion of coloring particles may be obtained by a fine dispersion treatment with beads having a particle size of from 0.01 mm to 1 mm and formed from glass, zirconium oxide or the like, using a vertical type or horizontal type sand grinder, a pin mill, a slit mill, an ultrasonic disperser or the like.

In the method for producing a dispersion of coloring particles, the removal of the organic solvent is not particularly limited, and the solvent may be removed by a known method such as distillation under reduced pressure.

The coloring particles in the dispersion of coloring particles thus obtained maintain a good dispersed state, and the obtained dispersion of coloring particles has excellent stability over time.

According to the invention, the volume average particle diameter of the coloring particles is preferably from 10 nm to 200 nm, more preferably from 10 nm to 150 nm, and still more preferably from 10 nm to 100 nm. When the volume average particle diameter is 200 nm or less, the color reproducibility is satisfactory, and in the case of ink jet method, the droplet ejection properties are good. Furthermore, when the volume average particle diameter is 10 nm or more, the light-fastness is satisfactory.

The particle diameter distribution of the coloring particles is not particularly limited, and may be any of a broad particle diameter distribution and a monodisperse particle diameter distribution. Two or more types of coloring particles having a monodisperse particle size distribution may also be used as a mixture.

Further, the volume average particle diameter and particle diameter distribution of the coloring particles may be measured, for example, using a dynamic light scattering method.

According to the invention, one type of the coloring particles may be used individually, or two or more types of the coloring particles may be used in combination.

(Water-Soluble Polymerizable Compound)

The ink composition of the invention contains at least one water-soluble polymerizable compound which has at least one polymerizable group and it polymerizes by actinic energy ray radiation.

Further, the term "water-soluble" described herein means that at least 2% by mass of the polymerizable compound is dissolved in distilled water at 25° C. It is preferably dissolved with the amount of at least 5% by mass, more preferably with the amount of at least 10% by mass, still more preferably with the amount of at least 20% by mass, and a compound which is mixed homogeneously with water at any ratio is particularly preferable.

The polymerizable group is not specifically limited if it is a functional group which may be polymerized by actinic energy ray, and examples include a vinyl group, an allyl group, a (meth)acryl group and their derivatives. Among these, from the view point of adhesion of the image to be formed, at least one selected from a group consisting of a (meth)acrylester group, a (meth)acrylamide group, a maleimide group, a vinylsulfone group and a N-vinylamide group is preferable and a (meth)acrylamide group is more preferable.

The "(meth)acrylate" used herein refers to at least "acrylate" or "methacrylate."

The number of the polymerizable group contained in the water-soluble polymerizable compound is not specifically limited. However, from the view points of adhesion and blocking resistance of an image to be formed, it is preferably 2 or more, more preferably 2 to 6, and still more preferably 2 to 3.

When the water-soluble polymerizable compound has at least two polymerizable groups, they may be the same or different to each other.

From the view points of curing sensitivity and blocking resistance, according to the invention it is preferable to have at least two polymerizable functional groups selected from a group consisting of a (meth)acrylamide group, a maleimide group and a vinylsulfone group. More preferably, it has at least one (meth)acrylamide group and still more preferably it has at least two (meth)acrylamide groups.

The water-soluble polymerizable compound preferably has at least one hydrophilic group in addition to the polymerizable group. As a hydrophilic group, any one of a nonionic group, an anionic group and a cationic group is available. Further, betaine is also available.

Specific examples of the water-soluble polymerizable group include an oxyalkylene group and its oligomer, a hydroxyl group, an amide group, a sugar alcohol residue, a urea group, an imino group, an amino group, a carboxy group, a sulfonate group, a phosphate group, a thiol group and a quaternary ammonium group.

According to the invention, from the view points of image adhesion, curing sensitivity and blocking resistance, the hydrophilic group is preferably selected from an oxyalkylene group and its oligomer, a hydroxyl group, an amide group, a sugar alcohol residue, an urea group, an imino group, a amino group, a carboxy group, a sulfonate group, a phosphate group and a thiol group. More preferably, it is at least one selected from an oxyalkylene group and its oligomer and a hydroxyl group. Still more preferably, it is at least one selected from an oxyethylene group, an oxypropylene group and their oligomers (n=1 to 2) and a hydroxyl group.

When the specific polymerizable compound described above has at least two polymerizable groups and also contains a hydrophilic group, bonding pattern between the polymerizable group and the hydrophilic group is not specifically limited. However, from the view points of curing sensitivity and blocking resistance, it is preferable to have a pattern in which at least two polymerizable groups are bonded via an at least divalent hydrophilic group.

The examples of the at least divalent hydrophilic group include a residue of a compound selected from the following compound group from which at least one hydrogen atom or hydroxyl group is removed.

—Compound Group—

Polyols such as ethylene glycol, diethylene glycol, triethylene glycol, polyethylene glycol, propylene glycol, dipropylene glycol, tripropylene glycol, polypropylene glycol, 1,3-propane diol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butane triol, 1,2,6-hexane triol, 1,2,5-pentane triol, thioglycol, trimethylol propane, ditrimethylol propane, trimethylol ethane, ditrimethylol ethane, neopentyl glycol, pentaerythritol, dipentaerythritol and their condensates, low molecular polyvinyl alcohol, or sugars.

Polyamines such as ethylenediamine, diethylenetridiamine, triethylenetetramine, polyethyleneimine and polypropylenediamine.

Saturated or unsaturated heterocycles such as pyridine, imidazole, pyrazine, piperidine, piperazine and morpholine.

Further, from the viewpoints of the curing sensitivity and blocking resistance of an image to be formed, the water-soluble polymerizable compound of the invention has the ratio of the molecular weight compared to the number of the polymerizable group contained in the water-soluble polymerizable compound, i.e., the value obtained by dividing the molecular weight of the polymerizable compound by the number of the polymerizable group contained per single molecule (molecular weight of the polymerizable compound/number of the polymerizable group contained, herein below, it may be referred to as "A value"), is preferably 175 or less, and more preferably 165 or less. Further, from the view point of the chemical structure, the A value is preferably 84 or more.

According to the invention, from the view point of the curing sensitivity and blocking resistance, it is preferable that the water-soluble polymerizable compound has at least two polymerizable groups selected from a group consisting of a (meth)acrylamide group, a maleimide group, a vinylsulfone group and a N-vinylamide group, and has the A value of 84 to 175. It is more preferable that it has at least two polymerizable groups selected from a group consisting of a (meth)acrylamide group, a maleimide group, a vinylsulfone group and a N-vinylamide group, and has the A value of 84 to 165. More particularly, it is a compound having at least two (meth)acrylamide groups and the A value of 84 to 165.

Further, it is preferable that the specific polymerizable compound described above has at least two polymerizable groups selected from a group consisting of a (meth)acrylamide group, a maleimide group, a vinylsulfone group and a N-vinylamide group and a nonionic hydrophilic group, and has the A value of 84 to 175. It is more preferable that it has at least two polymerizable groups selected from a group consisting of a (meth)acrylamide group, a maleimide group, a vinylsulfone group and a N-vinylamide group, at least one nonionic hydrophilic group selected from an oxyalkylene group, its oligomer and a hydroxyl group, and has the A value of 84 to 165. It is particularly more preferable that it has at least two (meth)acrylamide groups, at least one nonionic hydrophilic group selected from an oxyalkylene group, its oligomer and a hydroxyl group, and has the A value of 84 to 165.

Herein below, specific examples of the water-soluble polymerizable compound of the invention are described, but the invention is not limited thereto.

Polymerizable compound 1

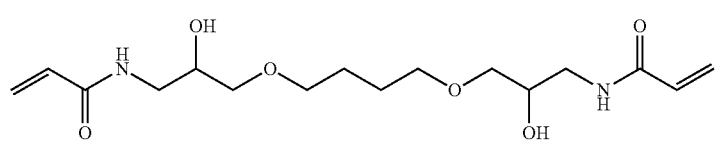

-continued

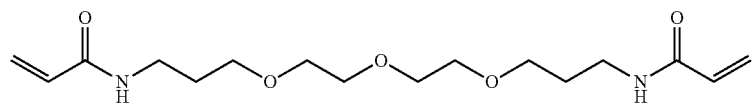
Polymerizable compound 2

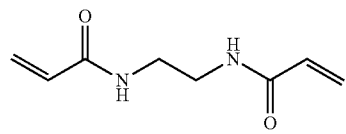
Polymerizable compound 3

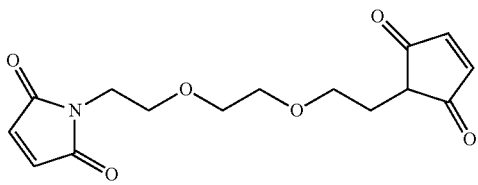
Polymerizable compound 4

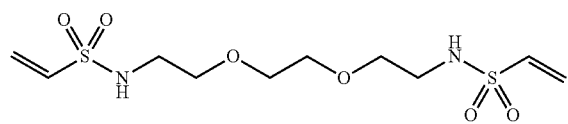
Polymerizable compound 5

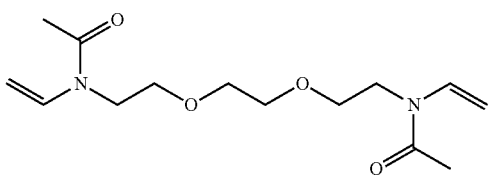
Polymerizable compound 6

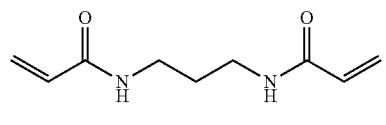
Polymerizable compound 7

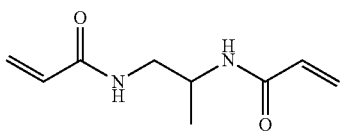
Polymerizable compound 8

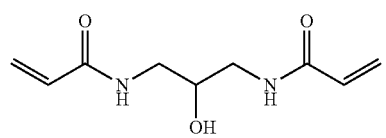
Polymerizable compound 9

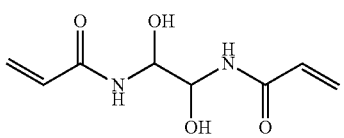
Polymerizable compound 10

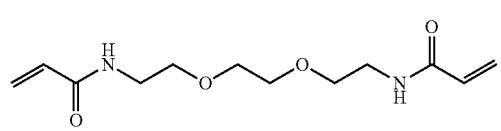
Polymerizable compound 11

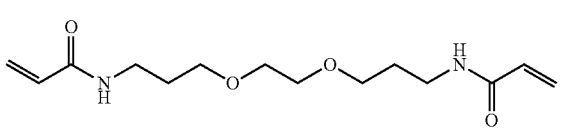
Polymerizable compound 12

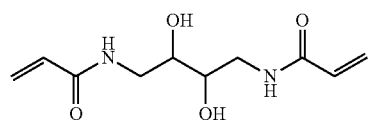
Polymerizable compound 13

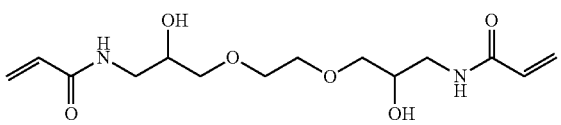
Polymerizable compound 14

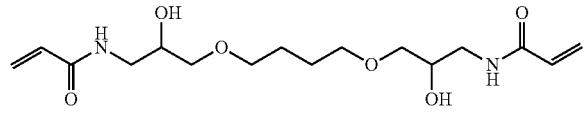
Polymerizable compound 15

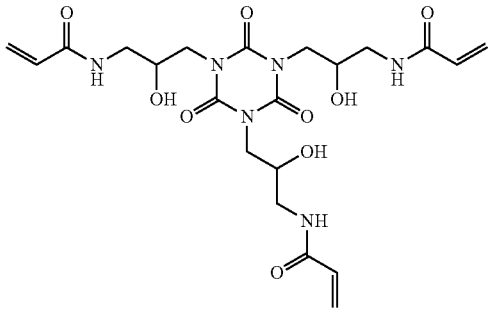
Polymerizable compound 16

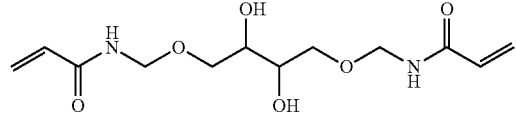
Polymerizable compound 17

Polymerizable compound 18

-continued
Polymerizable compound 19
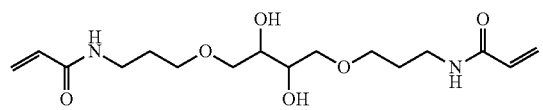
Polymerizable compound 20
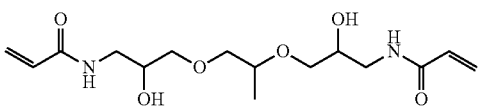
Polymerizable compound 21
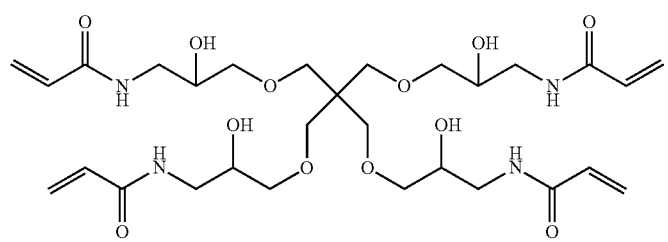
Polymerizable compound 22
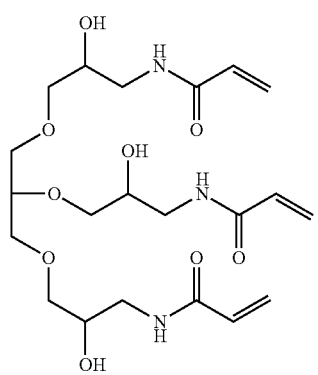
Polymerizable compound 23
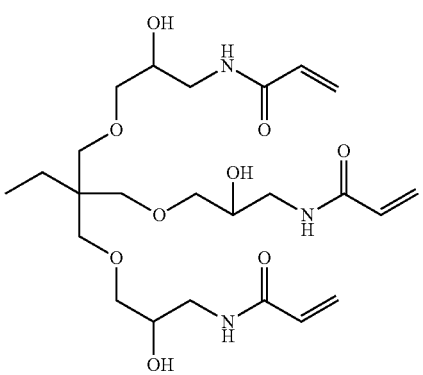
Polymerizable compound 24
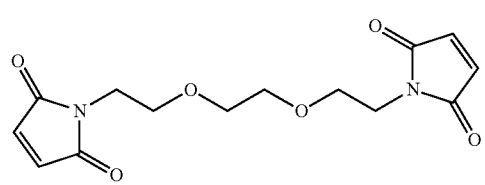
Polymerizable compound 25
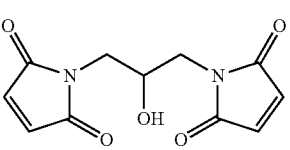
Polymerizable compound 26
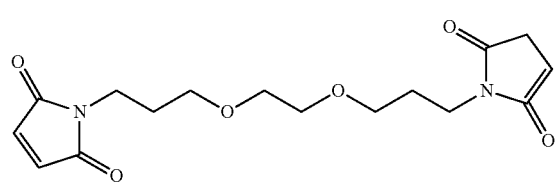
Polymerizable compound 27
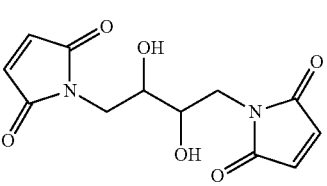
Polymerizable compound 28
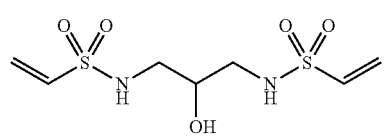
Polymerizable compound 29
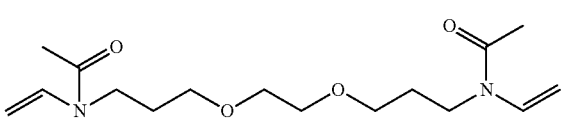
Polymerizable compound 30
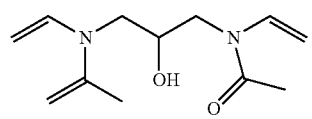
Polymerizable compound 31
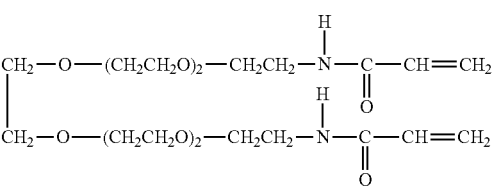

Polymerizable compound 32
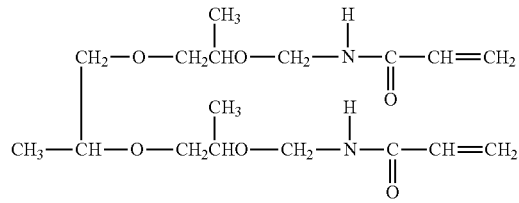
Polymerizable compound 33
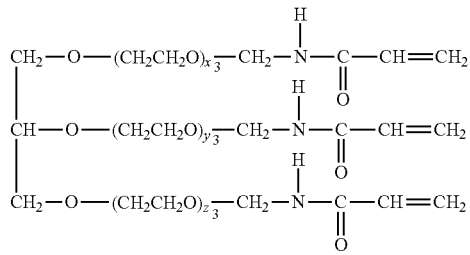
$x_3 + y_3 + z_3 = 6$
Polymerizable compound 34
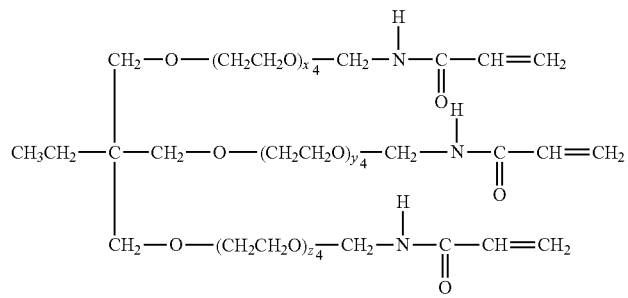
$x_4 + y_4 + z_4 = 9$
Polymerizable compound 35
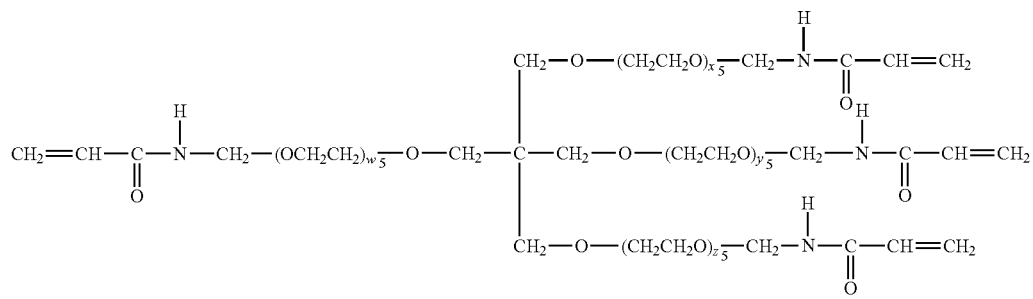
$w_5 + x_5 + y_5 + z_5 = 6$
Polymerizable compound 36
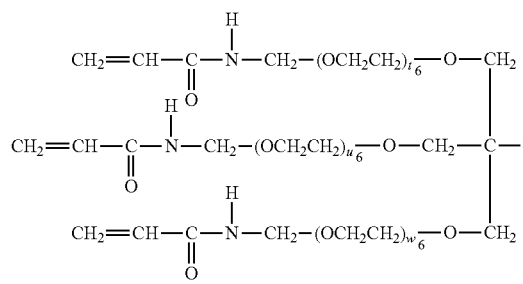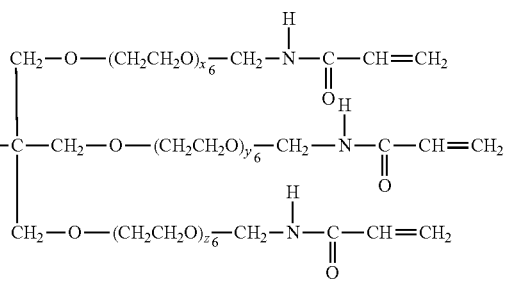
$t_6 + u_6 + w_6 + x_6 + y_6 + z_6 = 12$

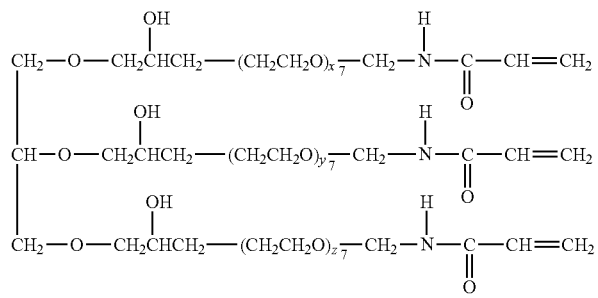

Polymerizable compound 37

$x_7 + y_7 + z_7 = 3$

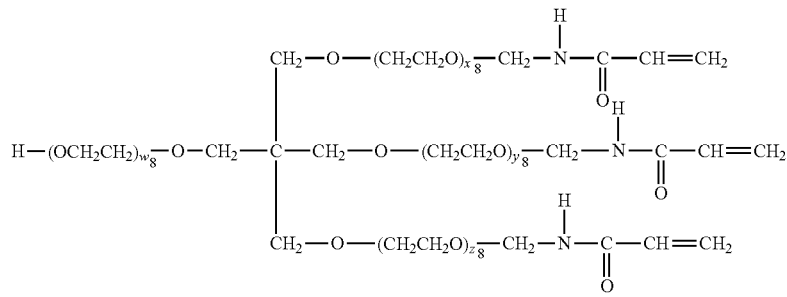

Polymerizable compound 38

$w_8 + x_8 + y_8 + z_8 = 6$

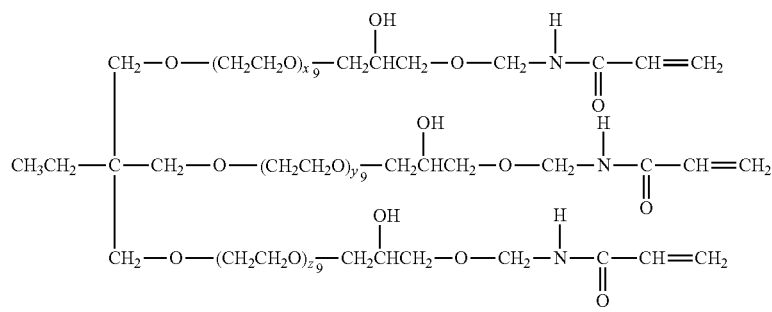

Polymerizable compound 39

$x_9 + y_9 + z_9 = 3$

As for the water-soluble polymerizable compound of the invention, the following water-soluble polymerizable compounds may be also suitably used in addition to the water-soluble polymerizable compounds described in the above.

Examples of the nonionic polymerizable monomer include a polymerizable compound like (meth)acryl monomer. Examples of the (meth)acryl monomer include a UV curing type monomer and oligomer like (meth)acrylate ester of polyhydric alcohol, (meth)acrylate ester of glycidyl ether of polyhydric alcohol, (meth)acrylate ester of polyethylene glycol, (meth)acrylate ester of ethylene oxide adduct of polyhydric alcohol and a reactant between polybasic acid anhydride and (meth)acrylate ester containing hydroxy group.

The polyhydric alcohol may have internal chain extension with an ethylene oxide chain according to addition of ethylene oxide.

Herein below, specific examples of the nonionic polymerizable compound (the nonionic polymerizable compound 1 to 6) are described. However, the invention is not limited thereto.

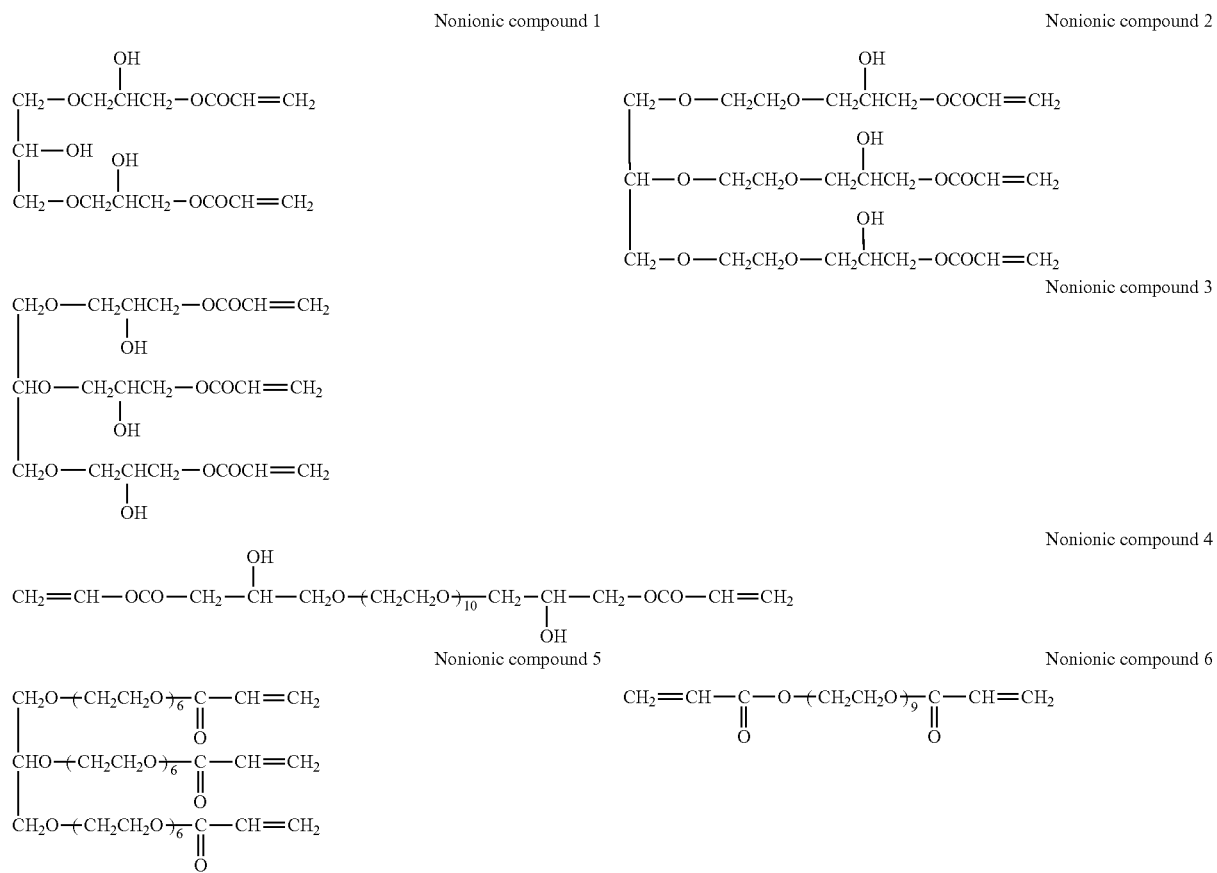

Further, an acrylic acid ester having at least two acryloyl groups in one molecule derived from a polyhydroxy compound may be also used. Examples of the polyhydroxy compound include a condensate of glycols like oligoether and oligoesters.

Further, suitable examples of the nonionic polymerizable compound include (meth)acrylate ester of polyol having at least two hydroxy groups like monosaccharides and disaccharide and; (meth)acrylate ester with triethanolamine, diethanolamine, trishydroxyaminomethane or trishydroxyaminomethane.

Further, a cationic water-soluble polymerizable compound may be also suitably used for the invention.

The cationic water-soluble polymerizable compound is a compound which has a cationic group and a polymerizable group like unsaturated double bond, and suitable examples thereof include epoxy monomers and oxetane monomers. When the cationic polymerizable compound is contained, the cationic property of the ink composition becomes strong as having a cationic group, and as a result color mixing that is caused by using an anionic ink is more effectively prevented.

Examples of the cationic polymerizable compound include N,N-dimethylaminoethylmethacrylate, N,N-dimethylaminoethylacrylate, N,N-dimethylaminopropylmethacrylate, N,N-dimethylaminopropylacrylate, N,N-dimethylaminoacrylamide, N,N-dimethylaminomethacrylamide, N,N-dimethylaminoethylacrylamide, N,N-dimethylaminoethylmethacrylamide, N,N-dimethylaminopropylacrylamide, N,N-dimethylaminopropylmethacrylamide and their quaternary compounds.

Examples of the epoxy monomer include glycidyl ether and glycidyl ester of polyhydric alcohol, and aliphatic cyclic epoxide.

Further, as an example of the cationic polymerizable compound, compounds having the following structure may be included.

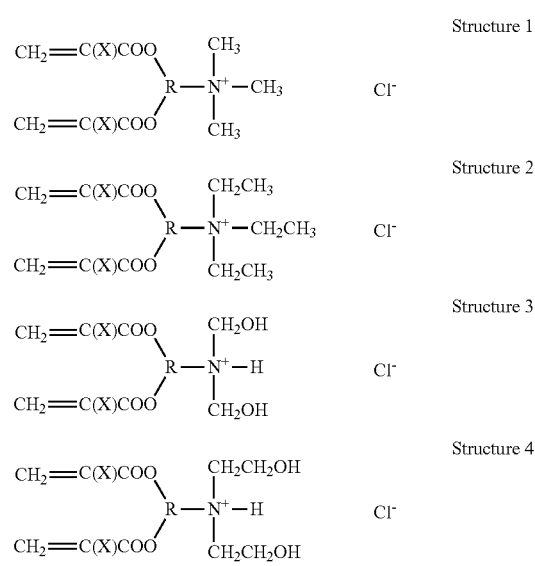

-continued

Structure 5
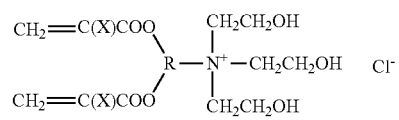

Structure 6
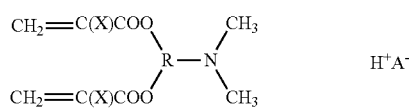

Structure 7
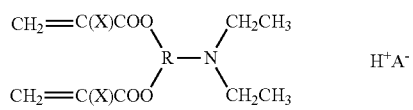

Structure 8
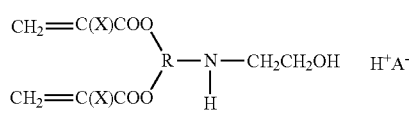

Structure 9
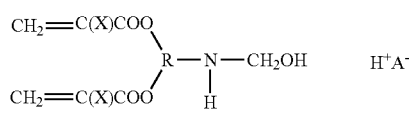

Structure 10
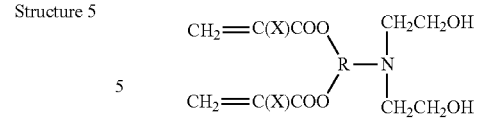

Structure 11
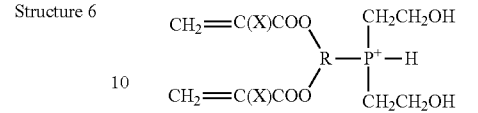

Structure 12
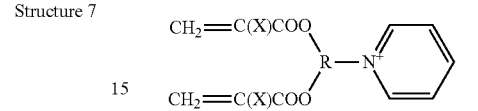

In the above structures, R represents a polyol residue. Further, X represents H or $CH_3$, and $A^-$ represents $Cl^-$, $HSO_3^-$ or $CH_3COO^-$. Examples of the compound for the introduction of the polyol include glycerin, 1,2,4-butane triol, 1,2,5-pentane diol, 1,2,6-hexane triol, trimethylol propane, trimethylol methane, trimethylol ethane, pentaerythritol, bisphenol A, alicyclic bisphenol A and their condensates.

Herein below, specific examples of the polymerizable compound having a cationic group are described (cationic compound 1 to 11).

Cationic compound 1
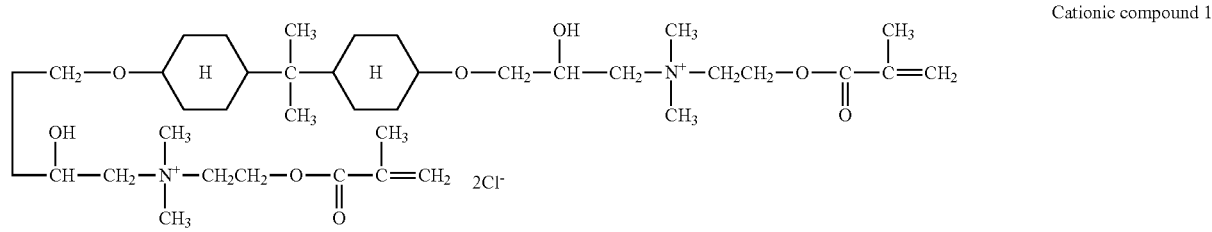
(with the proviso that, H is cyclohexane)

Cationic compound 2
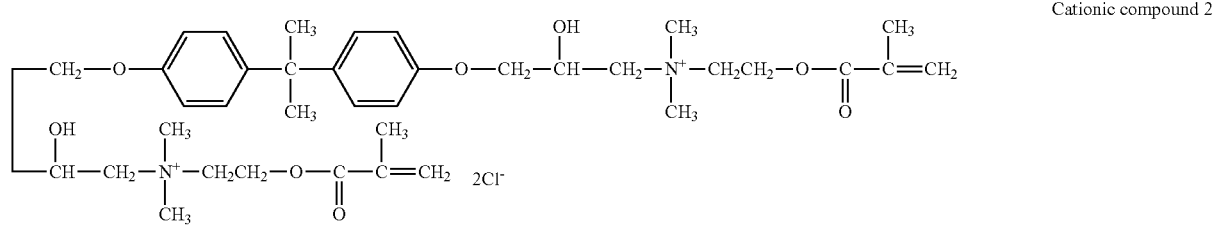

-continued
Cationic compound 3
Cationic compound 4
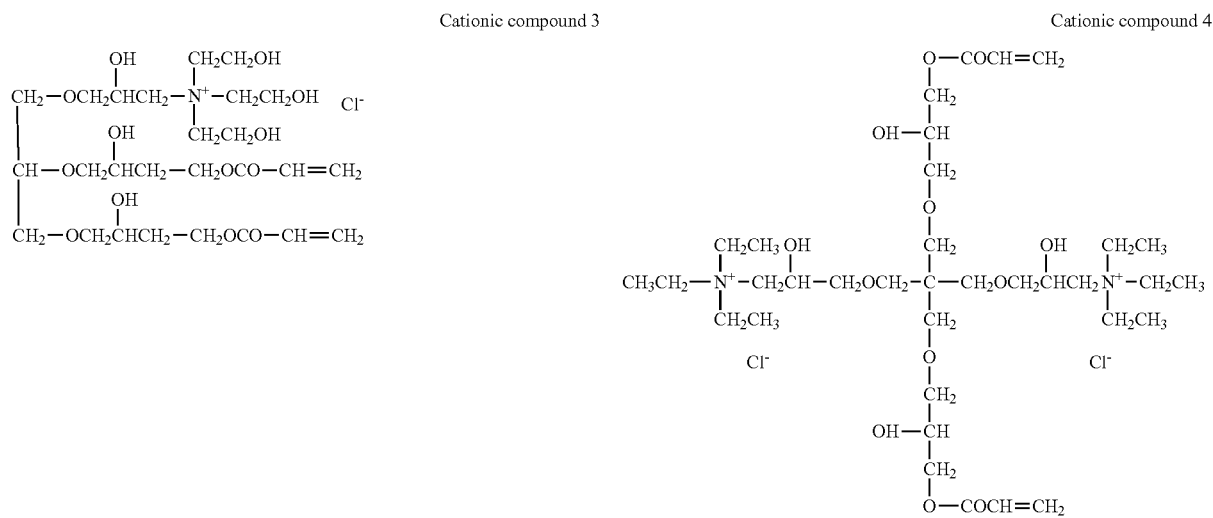
Cationic compound 5
Cationic compound 6
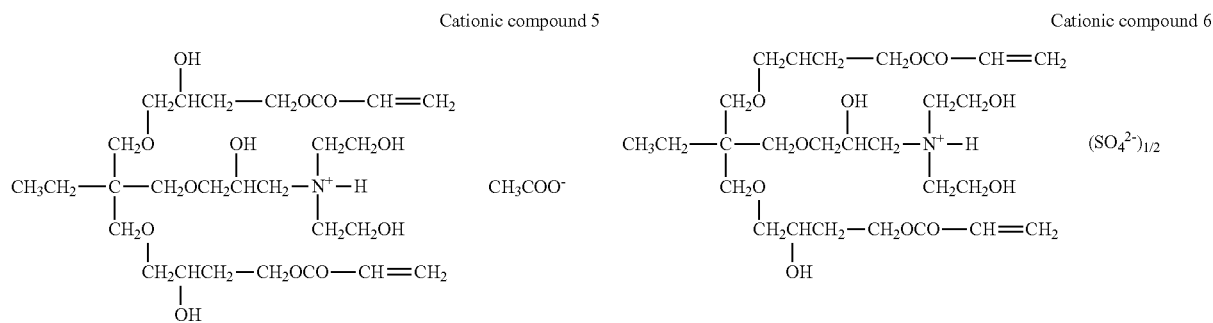
Cationic compound 7
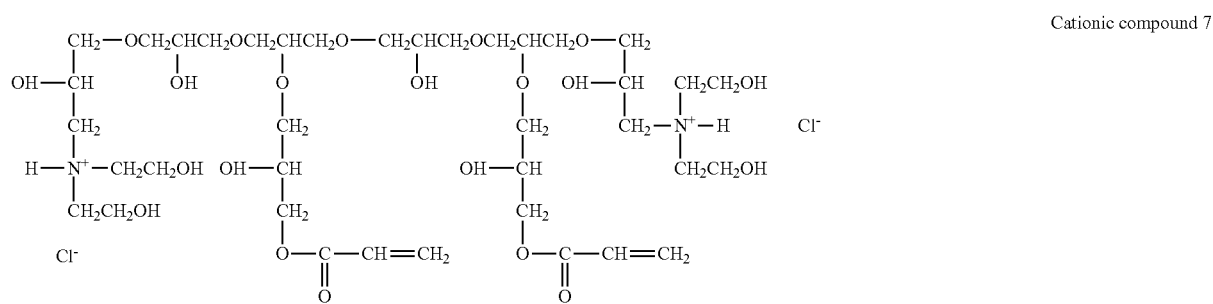
Cationic compound 8
Cationic compound 9
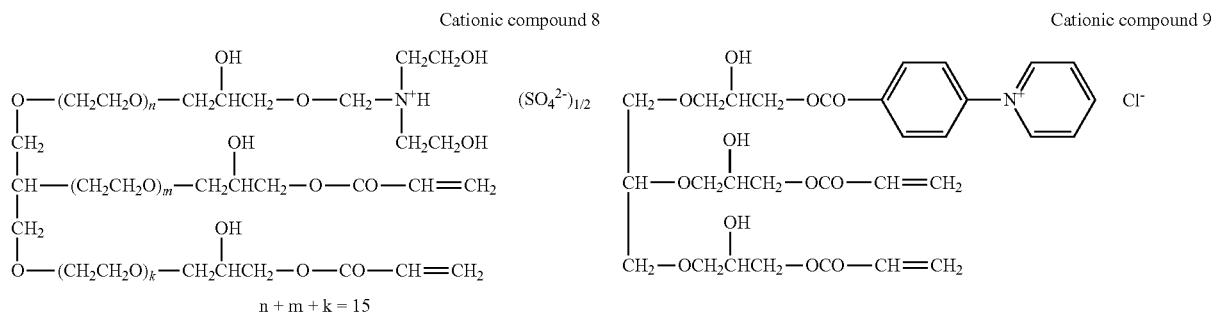
n + m + k = 15

-continued

Cationic compound 10

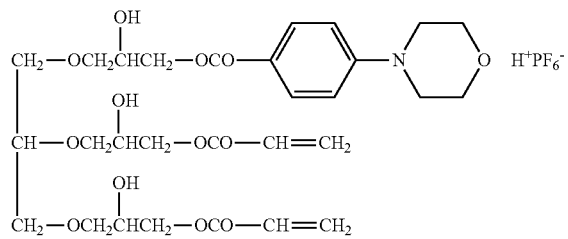

Cationic compound 11

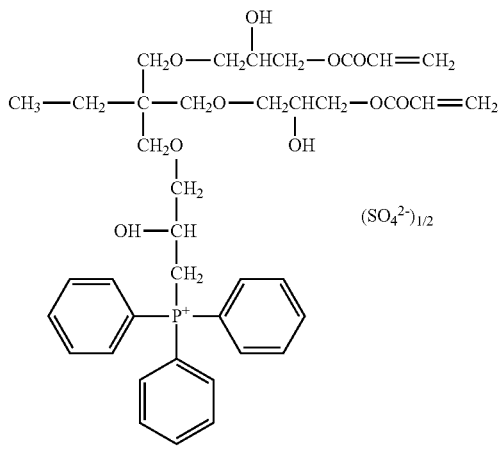

The water-soluble polymerizable compound may be used singly or in combination of two or more types.

Content of the water-soluble polymerizable compound in the ink composition of the invention is, in terms of the solid content, preferably in the range of 1% by mass to 50% by mass, more preferably in the range of 1% by mass to 40% by mass, still more preferably in the range of 1% by mass to 30% by mass, and most preferably in the range of 3% by mass to 20% by mass.

Further, from the view points of improving adhesion and friction resistance of an image to be formed and inhibiting pile height, content ratio of the water-soluble polymerizable compound compared to the coloring particles (i.e., water-soluble polymerizable compound/coloring particles) is preferably 1 to 30, and more preferably 3 to 15 in terms of mass ratio.

(Polymerization Initiator)

The ink composition of the invention contains at least one polymerization initiator. As for the polymerization initiator, a known polymerization initiator may be used without specific limitations. As a polymerization initiator of the invention, a photopolymerization initiator is preferably used.

Examples of a preferred photopolymerization initiator which may be used for the invention include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinum compounds, (j) metallocene compounds, (k) active ester compounds, (l) compounds having carbon-halogen bond, and (m) alkyl amine compounds and the like.

More specific examples include the photopolymerization initiators disclosed at page 65 to 148 of "UV Ray Koka Gijutsu" (written by Kato Kiyomi, 1989, published by Technical Information Institute Co., Ltd.).

As for the polymerization initiator of the invention, any one of a water-insoluble initiator dispersed in water and a water-soluble initiator may be used. However, the water-soluble polymerization initiator is preferable. Further, the term "water-soluble" regarding the polymerization initiator means the solubility of at least 0.5% by mass in distilled water at 25° C. The water-soluble polymerization initiator is preferably dissolved with the solubility of at least 1% by mass, and more preferably at least 3% by mass in distilled water at 25° C.

According to the invention, the polymerization initiator may be used singly or in combination of two or more types.

Content of the polymerization initiator included in the water-based ink composition of the invention is, in terms of the solid content, preferably in the range of 0.1% by mass to 30% by mass, more preferably in the range of 0.5% by mass to 20% by mass, and still more preferably in the range of 1.0% by mass to 10.0% by mass.

Further, content of the polymerization initiator included in the water-based ink composition of the invention is preferably in an amount of 0.01 to 35 parts by mass, more preferably 0.1 to 30 parts by mass, and still more preferably 1 to 20 parts by mass compared to 100 parts by mass of the polymerizable compound described above. In addition, herein, the content of the polymerization initiator means the total content of polymerization initiator in the water-based ink composition and the content of the polymerizable compound means the total content of polymerizable compound in the water-based ink composition.

(Water-Based Medium)

The ink composition of the invention contains an water-based medium. The water-based medium includes at least water and it is constituted by optionally containing at least one organic solvent.

As for the water used in the invention, water like ion exchange water and distilled water which does not contain ionic impurities is preferably used. Further, water content in the ink composition is suitably selected in accordance with the intended use. However, in general, 10 to 95% by mass is preferable and 30 to 90% by mass is more preferable.

—Organic Solvent—

The water-based medium used in the invention preferably includes at least one kind of water-soluble organic solvent. By including the water-soluble organic solvent, effects of drying prevention, moistening, promoting penetration or the like may be obtained. In order to prevent drying, the solvent may be used as an anti-drying agent for preventing nozzle clogging due to aggregation of ink that has been adhered and dried at an ejection port of a jetting nozzle. In terms of drying prevention or moistening, a water-soluble organic solvent having a lower vapor pressure than that of water is preferably used. Further, the water-soluble organic solvent may be used as a penetration promoter for improving the penetration ability of ink into paper.

Examples of the water soluble organic solvent include alkanediols (polyhydric alcohols) such as glycerol, 1,2,6-hexanetriol, trimethylolpropane, ethylene glycol, or propylene glycol; sugar alcohols; alkyl alcohols having 1 to 4 carbon atoms, such as ethanol, methanol, butanol, propanol, or isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, or tripropylene glycol monomethyl ether. One kind of these substances may be used singly or two or more kinds of these substances may be used in combination.

For the purpose of preventing drying or moistening, polyhydric alcohols are useful. Examples of the polyhydric alcohol include glycerol, ethylene glycol, diethylene glycol, triethylene glycol, propylene glycol, dipropylene glycol, tripropylene glycol, 1,3-butanediol, and 2,3-butane diol. One kind of these substances may be used singly or two or more kinds of these substances may be used in combination.

For the purpose of promoting penetration, polyol compounds are preferable and aliphatic diols are preferable. Examples of the aliphatic diol include 2-ethyl-2-methyl-1,3-propanediol, 3,3-dimethyl-1,2-butanediol, 2,2-diethyl-1,3-propanediol, 2-ethyl-1,3-hexanediol, and 2,2,4-trimethyl-1,3-pentanediol. Among the above, 2-ethyl-1,3-hexanediol and 2,2,4-trimethyl 1,3-pentanediol are preferable.

Further, the water-soluble organic solvent of the invention preferably contains at least one kind of the compound that is represented by the following structural formula (1), from the view point of inhibition of occurrence of a curl in a recoding medium.

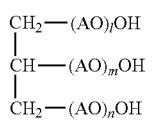

Structural formula (1)

In the structural formula (1), l, m and n each independently represent an integer of 1 or more, satisfying l+m+n=3 to 15, and l+m+n is preferably in the range of 3 to 12, and more preferably in the range of 3 to 10. When l+m+n is 3 or more, good curl inhibition power is obtained. When it is 15 or less, good ejection property is obtained. In the structural formula (1), AO represents at least one of ethylene oxy (EO) and propylene oxy (PO), and among them the propylene oxy group is preferable. Each AO included in $(AO)_l$, $(AO)_m$ and $(AO)_n$ may be the same or different to each other.

Herein below, examples of the compound that is represented by the structural formula (1) are described. However, the invention is not limited thereto. Further, regarding the exemplified compounds, the description "POP (3) glyceryl ether" means glyceryl ether in which total three propylene oxy groups are bonded to glycerin. It is the same for other descriptions.

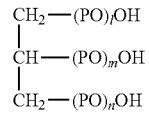

l + m + n = 3 POP (3) Glyceryl ether
l + m + n = 4 POP (4) Glyceryl ether
l + m + n = 5 POP (5) Glyceryl ether
l + m + n = 6 POP (6) Glyceryl ether
l + m + n = 7 POP (7) Glyceryl ether Further, regarding the water-soluble organic solvent of the invention, the water-soluble organic solvent that is exemplified below is also preferable from the view point of inhibition of occurrence of a curl.

n-$C_4H_9O(AO)_4$—H (AO=EO or PO, and the ratio is EO:PO=1:1)

n-$C_4H_9O(AO)_{10}$—H (AO=EO or PO, and the ratio is EO:PO=1:1)

HO$(AO)_{40}$—H (AO=EO or PO, and the ratio is EO:PO=1:3)

HO$(AO)_{55}$—H (AO=EO or PO, and the ratio is EO:PO=5:6)

HO$(PO)_3$—H

HO$(PO)_7$—H 1,2-hexanediol

Content ratio of the compounds that are represented by the structural formula (1) and the compounds exemplified above in the whole water-soluble organic solvent is preferably at least 3% by mass, more preferably at least 4% by mass, and still more preferably at least 5% by mass. By having this range, a curl may be inhibited without compromising the stability or ejection property of the ink, and therefore preferable.

According to the invention, the water-soluble organic solvent may be used singly or in combination of two or more types.

Further, content of the water-soluble organic solvent in the ink composition is preferably 1% by mass to 60% by mass, and more preferably 5% by mass to 40% by mass.

(Resin Particles)

The ink composition of the invention preferably contains at least one kind of resin particles. By having resin particles, adhesion of the ink composition to a recording medium and friction resistance and blocking resistance of an image may be effectively improved.

Further, it is preferable for the resin particles to have a function of fixing the ink composition, i.e., an image, by thickening the ink based on coagulation or destabilization of dispersion in contact with the treatment liquid or the region of the recording medium on which the treatment liquid is dried. These resin particles are preferably dispersed in water and at least one kind of organic solvent.

Examples of the resin particles of the invention include an acrylate resin, a vinyl acetate resin, a styrene-butadiene resin, a vinyl chloride resin, an acryl-styrene resin, a butadiene resin, a styrene resin, a cross-linked acrylate resin, a cross-linked styrene resin, a benzoguanamine resin, a phenol resin, a silicone resin, an epoxy resin, a urethane resin, a paraffin resin, a fluorine resin or their latex. Preferred examples include an acrylate resin, an acryl-styrene resin, a styrene resin, a cross-linked acrylate resin and a cross-linked styrene resin.

Further, the resin particles may be used in the form of latex.

Weight average molecular weight of the resin particles is preferably 10,000 to 200,000, and more preferably 100,000 to 200,000.

Further, volume average particle diameter of the resin particles is preferably in the range of 1 to 100 nm, more preferably in the range of 1 to 50 nm, still more preferably in the range of 1 to 25 nm, and particularly preferably in the range of 2 to 15 nm.

Glass transition temperature Tg of the resin particles is preferably 30° C. or more, more preferably 40° C. or more, and still more preferably 50° C. or more.

Addition amount of the resin particles is preferably 0.1 to 20% by mass, more preferably 0.1 to 15% by mass, and still more preferably 0.1 to 10% by mass compared to the ink.

Further, particle diameter distribution of the fine resin particles is not specifically limited, and any one of those having wide particle diameter distribution and those having mono-dispersed particle diameter distribution may be used. Further, it is possible to mix and use at least two kinds of the resin particles having mono-dispersed particle diameter distribution.

Surfactant

The ink composition according to the invention may contain a surfactant, if necessary. The surfactant may be used as a surface tension adjusting agent.

As the surface tension adjusting agent, a compound having a structure in which a hydrophilic moiety and a hydrophobic moiety are contained in the molecule may be effectively used, and any of anionic surfactants, cationic surfactants, amphoteric surfactants, nonionic surfactants, and betaine surfactants may be used. Further, the dispersants (polymeric dispersant) as described above may be used as surfactants.

In the present invention, from the viewpoint of suppressing ink droplet interference, a nonionic surfactant may be preferably used, and among the nonionic surfactants, an acetylene glycol derivative is more preferable.

When the ink composition contains a surfactant (surface tension adjusting agent), it is preferable that the surfactant be contained in such an amount that the surface tension of the ink composition may be adjusted to be within a range of from 20 to 60 mN/m, in view of performing the ejection of the ink composition satisfactorily by an ink jet method, and more preferably the surfactant is contained in such an amount such that the surface tension of the ink composition may be adjusted to be within a range of from 20 to 45 mN/m, and even more preferably within a range of from 25 to 40 mN/m.

The specific amount of the surfactant in the ink composition is not particularly limited, and may be an amount by which a surface tension may be in the preferable range. The amount of the surfactant(s) is preferably 1% by mass or more, more preferably from 1% by mass to 10% by mass, and even more preferably from 1% by mass to 3% by mass.

Other Components

The ink composition may further contain various additives as other components according to necessity, in addition to the components described above.

Examples of the various additives include those known additives such as an ultraviolet absorbent, a fading preventing agent, an anti-mold agent, a pH adjusting agent, an anti-rust agent, an antioxidant, an emulsion stabilizer, a preservative, an antifoaming agent, a viscosity adjusting agent, a dispersion stabilizer, a chelating agent, and a solid-wetting agent.

Examples of the ultraviolet absorbent include benzophenone-based ultraviolet absorbents, benzotriazole-based ultraviolet absorbents, salicylate-based ultraviolet absorbents, cyanoacrylate-based ultraviolet absorbents, and nickel complex salt-based ultraviolet absorbents.

As the fading preventing agent, any of various organic fading preventing agents and metal complex-based fading preventing agents may be used. Examples of the organic fading preventing agent include hydroquinones, alkoxyphenols, dialkoxyphenols, phenols, anilines, amines, indanes, chromans, alkoxyanilines, and heterocycles. Examples of the metal complex include nickel complexes, and zinc complexes.

Examples of the anti-mold agent include sodium dehydroacetate, sodium benzoate, sodium pyridinethione-1-oxide, p-hydroxybenzoic acid ethyl ester, 1,2-benzisothiazolin-3-one, sodium sorbate, sodium pentachlorophenol.

The content of the anti-mold agent in the ink composition is preferably in the range of from 0.02% by mass to 1.00% by mass.

The pH adjusting agent is not particularly limited as long as the agent may adjust the pH to a desired value without exerting any adverse effects on the ink composition to be prepared, and may be appropriately selected according to the purpose. Examples thereof include alcohol amines (for example, diethanolamine, triethanolamine, 2-amino-2-ethyl-1,3-propanediol), alkali metal hydroxides (for example, lithium hydroxide, sodium hydroxide, potassium hydroxide), ammonium hydroxides (for example, ammonium hydroxide, quaternary ammonium hydroxide), phosphonium hydroxide, alkali metal carbonates.

Examples of the anti-rust agent include acidic sulfurous acid salts, sodium thiosulfate, ammonium thiodiglycolate, diisopropylammonium nitrite, pentaerythritol tetranitrate, dicyclohexylammonium nitrite.

Examples of the antioxidant include phenol-based antioxidants (including hindered phenol-based antioxidants), amine-based antioxidants, sulfur-based antioxidants, phosphorus-based antioxidants.

Examples of the chelating agent include sodium ethylenediaminetetraacetate, sodium nitrilotriacetate, sodium hydroxyethylethylenediaminetriacetate, sodium diethylenetriaminepentaacetate, sodium uramyldiacetate.

Properties of Ink Composition—

The surface tension (25° C.) of the ink composition according to the invention is preferably from 20 mN/m to 60 mN/m. More preferably, the surface tension is from 20 mN/m to 45 mN/m, and even more preferably from 25 mN/m to 40 mN/m.

The surface tension of the ink composition is measured under the conditions of a temperature of 25° C. using an automatic surface tensiometer (trade name: CBVP-Z, manufactured by Kyowa Interface Science Co., Ltd.).

The viscosity at 25° C. of the ink composition according to the invention is preferably from 1 mPa·s to 10 mPa·s, more preferably from 2 mPa·s to less than 8 mPa·s, and even more preferably from 4 mPa·s to less than 7 mPa·s.

The viscosity of the ink composition is measured under the conditions of a temperature of 25° C. using a viscometer (trade name: TV-22, manufactured by Toki Sangyo Co., Ltd.).

By applying the ink composition having surface tension and viscosity within the range described above to a recoding medium which has the above specific physical property values, an image with excellent adhesion may be formed.

[Treatment Liquid]

The ink set contains at least one kind of coagulant which can form an aggregate upon contact with the ink composition, and it is constituted by containing other components, if necessary.

By having a coagulant in the treatment liquid, an image with good quality and excellent blocking resistance may be formed.

(Coagulant)

The treatment liquid of the invention contains a coagulant which coagulates the components of the ink composition. The coagulant of the invention can coagulate (fix) the ink composition by means of contact with the ink composition on a recording medium, and functions as a fixing agent. For example, in a state in which the treatment liquid has been applied to the specific recording medium of the invention and the coagulant is thus present on the recording medium, the ink composition may then also be spotted so as to contact the coagulant, whereby the components of the ink composition coagulate and the components of the ink composition are fixed onto the recording medium.

Examples of the components which fix the components of the ink composition include an acidic compound and a polyvalent metal salt. These may be used singly or in combination of two or more types.

—Acidic Compound—

Suitable examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furancarboxylic acid, pyridine carboxylic acid, coumaric acid, thiophene carboxylic acid, nicotinic acid, and derivatives thereof, and salts thereof.

Among these, acidic compounds having higher water solubility are preferable. Further, from the viewpoint of fixing the whole ink based on the reaction with the ink composition, acidic compounds that are no more than trivalent are preferable and divalent to trivalent acidic compounds are particularly preferable.

The acidic compounds may be used singly or in combination of two or more types.

When the treatment liquid contains an acidic compound, pH (25° C.) of the treatment liquid is preferably 0.1 to 6.8, more preferably 0.5 to 6.0, and still more preferably 0.8 to 5.0.

Content of the acidic compound is, compared to the total mass of the treatment liquid, preferably at most 40% by mass, and more preferably 10 to 30% by mass. By having the content of the acidic compound of 10 to 30% by mass, the components of the ink composition may be more effectively fixed.

Applying amount of the acidic compound on a recording medium is not specifically limited, if it is an amount which is sufficient for coagulating the ink composition. From the view point of easiness of fixing the ink composition, it is preferably 0.1 $g/m^2$ to 2.0 $g/m^2$, and more preferably 0.1 $g/m^2$ to 1.0 $g/m^2$.

—Polyvalent Metal Salts—

The polyvalent metal salts of the invention is a compound containing at least divalent metal like alkali earth metal and zinc group metal, and examples include acetate and oxide of a metal ion like $Ca^{2+}$, $Cu^{2+}$ and $Al^{3+}$.

According to the invention, the coagulation reaction of the ink composition when it is ejected on a recording medium to which a treatment liquid containing the polyvalent metal salts described above has been applied may be achieved by lowering the dispersion stability of particles dispersed in the ink composition, for example the particles like coloring material represented by a pigment or resin particles, and increasing the viscosity of the whole ink composition. For example, when the particles in the ink composition like pigment or resin particles have a weakly acidic functional group like carboxy group, dispersion of the particles is stabilized by the action of the weakly acidic functional group. However, according to the interaction with the polyvalent metal salts, the surface charges on the particles may be reduced to lower the dispersion stability. As such, from the view point of the coagulation reaction, the polyvalent metal salts as a fixing agent contained in the treatment liquid are required to have valency of at least two, i.e., polyvalent. From the view point of the coagulation reactivity, they are a polyvalent metal salt consisting of at least trivalent polyvalent metal ions.

In view of the above, the polyvalent metal salts that may be used for the treatment liquid of the invention are preferably at least one of the salts between the polyvalent metal ions described below and an anion, polyaluminum hydroxide and polyaluminum chloride.

Examples of the polyvalent metal salts include $Ca^{2+}$, $Cu^{2+}$, $Ni^{2+}$, $Mg^{2+}$, $Sr^{2+}$, $Zn^{2+}$, $Ba^{2+}$, $Al^{3+}$, $Fe^{3+}$, $Cr^{3+}$, $Co^{3+}$, $Fe^{2+}$, $La^{3+}$, $Nd^{3+}$, $Y^{3+}$ and $Zr^{4+}$. In order to have the polyvalent metal ions contained in the treatment liquid, the polyvalent metal salts described may be used.

Salts indicate a metal salt consisting of the polyvalent metal ions above and an anion which binds to the ions. Those that are soluble in a solvent are preferable. Herein, the solvent indicates a medium which constitutes the treatment liquid together with the polyvalent metal salts. Examples thereof include water and the organic solvents that are described below.

Examples of the preferred anions to form salts with polyvalent metal ions include $Cl^-$, $NO_3^-$, $I^-$, $Br^-$, $ClO_3^-$, $CH_3COO^-$ and $SO_4^{2-}$.

The polyvalent metal ions and an anion may form a salt with polyvalent metal ions and an anion by using single type or multiple types thereof, respectively.

Examples of the polyvalent metal salts other than those described above include polyaluminum hydroxide and polyaluminum chloride.

From the view points of reactivity, coloration property and also easy handleability, etc., it is preferable in the invention to use salts between the polyvalent metal ions and an anion. As for the polyvalent metal ions, at least one selected from $Ca^{2+}$, $Mg^{2+}$, $Sr^{2+}$, $Al^{3+}$ and $Y^{3+}$ is preferable. $Ca^{2+}$ is more preferable.

Further, as for the anion, $NO_3^-$ is particularly preferable from the view points of solubility or the like.

The polyvalent metal salts may be used singly or in combination of two or more types.

Content of the polyvalent metal salts is at least 15% by mass relative to the total mass of the treatment liquid. By having at least 15% by mass of the content of the polyvalent metal salts, components of the ink composition may be more effectively fixed.

Content of the polyvalent metal salts is preferably 15% by mass to 35% by mass, and more preferably 20% by mass to 30% by mass relative to the total mass of the treatment liquid.

Application amount of the polyvalent metal salts on a recording medium is not specifically limited if it is an amount sufficient for coagulating the ink composition. However, from the view point of easy fixing of the ink composition, it is preferably 0.5 $g/m^2$ to 4.0 $g/m^2$ and more preferably 0.9 $g/m^2$ to 3.75 $g/m^2$.

EXAMPLES

Hereinafter, the invention will be specifically described with reference to Examples, but is not limited to the following Examples insofar as the gist thereof is not exceeded. Unless otherwise specified, "part" and "%" each are based on mass.

<Production of Recording Medium 1>

[Preparation of First Layer (Undercoat Layer) Coating Liquid]

One hundred parts of titanium dioxide (trade name: TIPAQUE R-780, manufactured by Ishihara Industry, Co., Ltd.), 1.2 parts of sodium salt of 25% special polycarboxylic acid type polymer (trade name: DEMOL EP, manufactured by Kao Corp.) and 121.7 parts of water were mixed, the mixture was dispersed using a non-bubbling kneader (trade name: NBK-2, manufactured by Nippon Seiki Co., Ltd.), and therefore a dispersion liquid containing 45% of titanium dioxide was obtained.

Next, into 100 parts of 35% of styrene-butadiene latex (minimum film forming temperature: 0° C., trade name: NIPOL LX110, manufactured by Nippon Zeon Co., Ltd.), 100 parts of water and 3.9 parts of the obtained dispersion liquid containing 45% of titanium dioxide were added, sufficiently stirred and mixed, and the liquid temperature of the obtained mixture liquid was maintained at 15° C. to 25° C., thereby obtaining a 18.0% undercoat layer coating liquid.

[Preparation of Second Layer (Top Coat Layer) Coating Liquid]

60 parts of heavy calcium carbonate (trade name: ESCALON #2000, manufactured by Sankyo Seifun Co., Ltd.), 20 parts of kaolin (trade name: MIRAGLOSS, manufactured by Engelhard Corporation, U.S.), 20 parts of titanium oxide (TIPAQUE R-780, manufactured by Ishihara Industry, Co., Ltd.) and 0.5 parts of 43% of sodium polyacrylate (trade name: ARON T-50, manufactured by Toagosei Co., Ltd.) were mixed to prepare a mixture, which was then dispersed in water using an NBK-2 (trade name) manufactured by Nippon Seiki Co., Ltd. Into the dispersion liquid, 11 parts of styrene-butadiene copolymer latex having an average particle diameter of 95 nm (trade name: SMARTEX PA2323, manufactured by Nippon A&L Inc.), 3 parts of starch oxide (trade name: ACE B, manufactured by Oji Cornstarch Co., Ltd.) and 1 part of lubricant (trade name: SN COAT 231 SP, manufactured by Sun Nopco Co. Ltd.) were added, and a top coat coating liquid having a final solid content concentration of 65% was thus prepared.

[Formation of First Layer (Undercoat Layer)]

On both surfaces of high quality paper having a basis weight of 81.4 g/m$^2$ (trade name: SHIRAOI, manufactured by Nippon Paper Industries Co., Ltd.), the obtained undercoat layer coating liquid was applied using a bar coater so that the coating amount per one surface became 10.0 g/m$^2$, and each of the coated surfaces was dried at 50° C. for 3 minutes, thereby forming a undercoat layer. The undercoat layers formed at this stage had a thickness of 9.4 μm.

[Formation of Second Layer (Top Coat Layer)]

On both surfaces of the high quality paper with the undercoat layers provided, the prepared top coat layer coating liquid was applied using a high-speed leaf blade coater (trade name: PM-9040 M, manufactured by SMT Co., Ltd.) so that the dry mass per one surface became 10 g/m$^2$, and each of the coated surfaces was dried at a temperature of 150° C. and a wind velocity of 20 msec for 3 seconds, thereby forming a top coat layer to obtain recording medium 1. In this case, the top coat layers formed at this stage had a thickness of 9.5 μm per one surface.

<Production of Recording Medium 2>

[Preparation of First Layer (Undercoat Layer) Coating Liquid]

Kaolin (trade name: KAOBRITE 90, manufactured by Shiraishi Calcium Kaisha, Ltd.) 100 parts, 0.1 mol/L sodium hydroxide (manufactured by Wako Pure Chemical Industries, Ltd.) 3.8 parts, 40% sodium polyacrylate (trade name: ARON P50, manufactured by Toagosei Co., Ltd.) 1.3 parts and water 49.6 parts were mixed together and the resultant mixture was dispersed with a non-bubbling kneader (trade name: NBK-2, manufactured by Nippon Seiki Co., Ltd.), to thereby prepare a 65% kaolin dispersion. Subsequently, the thus-prepared 65% kaolin dispersion 7.0 parts, water 5 parts and 10% EMULGEN 109P (trade name) manufactured by Kao Corp. 0.8 parts were added to a 22.5% aqueous polyester urethane latex dispersion (glass transition temperature: 49° C., minimum film forming temperature: 29° C.; trade name: HYDRAN AP-40F (trade name) manufactured by Dainippon Ink and Chemicals, Inc.) 100 parts, followed by sufficient stirring and mixing. The liquid temperature of the thus-obtained liquid mixture was maintained at 15° C. to 25° C. to prepare a 24.0% undercoat layer coating liquid.

[Preparation of Second Layer (Top Coat Layer) Coating Liquid]

Kaolin (trade name: KAOBRITE 90, manufactured by Shiraishi Calcium Kaisha, Ltd.) 100 parts, 0.1 N sodium hydroxide (manufactured by Wako Pure Chemical Industries, Ltd.) 3.8 parts, 40% sodium polyacrylate (trade name: ARON T-50, manufactured by Toagosei Co., Ltd.) 1.3 parts and water 49.6 parts were mixed together, and the resultant mixture was dispersed with a non-bubbling kneader (trade name: NBK-2, manufactured by Nihonseiki Kaisha Ltd.), to thereby prepare a 65% kaolin dispersion. Subsequently, a 50% latex of styrene-butadiene copolymer with an average particle diameter of 130 nm (trade name: NIPOL LX407K, manufactured by Zeon Corporation) 14 parts, an emulsion of fatty acid calcium (trade name: NOPCOAT C-104-HS, manufactured by San Nopco Limited) 1 part, a 1% carboxymethyl cellulose sodium salt (trade name: SEROGEN EP, manufactured by Dai-ichi Kogyo Seiyaku Co.) 10 parts and a 10% aqueous EMULGEN 109P solution (trade name) manufactured by Kao Corp. 0.5 parts were added to the dispersion, to thereby prepare a top coat layer coating liquid having a final solid content of 59%. The thus-prepared top coat layer coating liquid was found to have a high-shear viscosity of 50.2 mPa·s to 138.2 mPa·s.

[Formation of Undercoat Layer]

The above-prepared undercoat layer coating liquid was coated on each of two surfaces of high quality paper having a basis weight of 81.4 g/m$^2$ (trade name: SHIRAOI, manufactured by Nippon Paper Co.) with a bar coater to a coating amount of 8.0 g/m$^2$ per surface followed by drying at 70° C. for 3 min, thereby forming a undercoat layer. The thickness of the undercoat layer was found to be 8.1 μm. The thus-formed undercoat layer was further subjected to a soft calender treatment as described below.

—Soft Calendar Treatment—

The soft calender treatment was carried out with respect to the high quality paper with the undercoat layer provided on its surface by using a soft calender having a pair of metal and resin rollers under the following conditions: surface temperature of the metal roller of 50° C. and nip pressure of 50 kg/cm.

[Formation of Second Layer (Top Coat Layer)]

On both surfaces of the high quality paper with the undercoat layer provided, the prepared top coat layer coating liquid was applied using a high-speed leaf blade coater (trade name: PM-9040 M, manufactured by SMT Co., Ltd.) so that the dry mass per one surface became 20 g/m$^2$, and each of the coated surfaces was dried at a temperature of 150° C. and a wind velocity of 20 msec for 3 seconds, thereby forming a top coat layer. In this case, the top coat layers formed at this stage respectively had a thickness of 19.1 μm per one surface.

Further, by carrying out the soft calendar treatment on the formed undercoat layer, recording medium 2 was obtained.

—Soft Calendar Treatment—

The soft calender treatment was carried out with respect to the high quality paper with the top coat layer provided on its surface by using a soft calender having a pair of metal and resin rollers under the following conditions: surface temperature of the metal roller of 50° C. and nip pressure of 50 kg/cm.

<Production of Recording Medium 3>

Recording medium 3 was produced in the same manner as the production of recording medium 1 except that "preparation of undercoat layer coating liquid" and "formation of undercoat layer" are modified as follows and the coating amount of the top coat layer coating liquid per one surface is changed to 10.8 g/m$^2$ for forming the top coat layer in the production of recording medium 1. Herein, the thickness of thus-formed undercoat layer was 8.0 μm and the thickness of thus-formed top coat layer was 11.0 μm.

[Preparation of First Layer (Undercoat Layer) Coating Liquid]

(1) Preparation of polyvinyl alcohol solution 12 parts of polyvinyl alcohol (saponification degree: 98.5%, polymerization degree: 1,700, trade name: PVA-117, manufactured by Kuraray Co., Ltd.) were added to 88 parts of water, and dissolved at 90° C. or above under stirring.

(2) Water-swellable mica dispersion (aspect ratio: 1,000, trade name: SOMASIF MEB-3 (8% solution), manufactured by Co-op Chemical Co. Ltd., mica dispersion having average particle diameter of 2.0 μm).

(3) Ethylene oxide surface active agent (trade name: EMALEX 710, manufactured by Nihon-Emulsion Co., Ltd.) 1.66% solution (dissolved in methanol).

Into 100 parts of the 12% polyvinyl alcohol solution (1), 58 parts of water were added, sufficiently stirred and mixed, 18 parts of the 8% water-swellable mica dispersion liquid (2) were added thereto and sufficiently stirred and mixed, and 3 parts of the 1.66% ethylene oxide surface active agent solution (3) were added thereto. The liquid temperature of the obtained mixture liquid was maintained at 30° C. to 35° C., and a undercoat layer coating liquid was obtained.

[Formation of First Layer (Undercoat Layer)]

The above-prepared undercoat layer coating liquid was coated on each of two surfaces of high quality paper having a basis weight of 81.4 g/m$^2$ (trade name: SHIRAOI, manufactured by Nippon Paper Co.) with a bar coater to a coating amount of 8.0 g/m$^2$ per one surface, followed by drying at 50° C. for 3 min, to thereby form a undercoat layer.

<Production of Recording Medium 4>

Recording medium 4 was produced in the same manner as the production of recording medium 1 except that "preparation of undercoat layer coating liquid" is modified as follows and the coating amount of the undercoat layer coating liquid per one surface for forming the undercoat layer and the coating amount of the top coat layer coating liquid per one surface for forming the top coat layer in the production of recording medium 3 is changed to 5.0 g/m$^2$ and 10.1 g/m$^2$, respectively. Herein, the thickness of thus-formed undercoat layer was 5.2 μm and the thickness of thus-formed top coat layer was 9.9 μm.

[Preparation of First Layer (Undercoat Layer) Coating Liquid]

(1) Preparation of acetoacetyl modified polyvinyl alcohol 12 parts of acetoacetyl modified polyvinyl alcohol (saponification degree: 95 to 97%, polymerization degree: 1,000, trade name: GOHSEFIMER Z-210, manufactured by The Nippon Synthetic Chemical Industry Co., Ltd.) were added to 88 parts of water, and dissolved at 90° C. or above under stirring.

(2) Water-swellable mica dispersion (aspect ratio: 1,000, trade name: SOMASIF MEB-3 (8% solution), manufactured by Co-op Chemical Co. Ltd., mica dispersion having average particle diameter of 2.0 μm).

(3) Ethylene oxide surface active agent (trade name: EMALEX 710, manufactured by Nihon-Emulsion Co., Ltd.) 1.66% solution (dissolved in methanol).

Into 100 parts of the 12% acetoacetyl modified polyvinyl alcohol solution (1), 58 parts of water were added, sufficiently stirred and mixed, 18 parts of the 8% water-swellable mica dispersion liquid (2) were added thereto and sufficiently stirred and mixed, and 3 parts of the 1.66% ethylene oxide surface active agent solution (3) were added thereto followed by sufficient mixing. Subsequently, as a hardener solution, 15.0 parts of 40% aqueous solution of glyoxal was added and sufficiently mixed. The liquid temperature of the obtained mixture liquid was maintained at 30° C. to 35° C., and a undercoat layer coating liquid was thus obtained.

<Production of Recording Medium C1 to C22

In view of Comparative examples 1 to 3 described in paragraphs [0249] to [0251] of JP-A No. 2009-73158, recording medium C1 to C3 were produced.

<Evaluation of Recording Medium>

On the recording medium obtained above, "Cobb water absorption degree test of high quality paper with undercoat layer formed thereon" and "water absorption amount test of top coat layer" were carried out as follows. Results are shown in Table 1.

—Cobb Water Absorption Degree Test of High Quality Paper with Undercoat Layer Formed Thereon—

(1) Cobb water absorption degree (amount of water penetrated (g/m$^2$) when being contact with 20° C. water for 15 seconds) of the coated surface of the high quality paper with the undercoat layer formed thereon was measured according to the water absorption degree test method stipulated in JIS P8140.

(2) Cobb water absorption degree (amount of water penetrated (g/m$^2$) when being contact with 20° C. water for 2 minutes) of the coated surface of the high quality paper with the undercoat layer formed thereon was measured according to the water absorption degree test method stipulated in JIS P8140.

(3) Cobb value (amount of diethylene glycol penetrated (g/m$^2$) when being contact with 20° C. diethylene glycol for 2 minutes) of the coated surface of the high quality paper with the undercoat layer formed thereon was measured according to the water absorption degree test method stipulated in JIS P8140.

—Water Absorption Amount Test of Top Coat Layer—

Measurement was carried out based on the Bristow's method as follows.

(1) A top coat layer sample which was cut in A6 size was set on a measurement disc, a head filled with a test liquid (water) was made contact with the surface of the sample, and the sample surface was automatically scanned along a spiral scanning line from the inside to the outside direction to thereby measure the liquid absorption property of the sample. A relationship between a contact time and a liquid absorption amount (water absorption amount) was obtained by changing step-by-step the rotation rate of the measurement disc (the contact time between paper and ink). Table 1 shows the water absorption amount with a contact time of 0.5 seconds.

(2) The measurement was carried out in a similar manner to the method described above (1), except that the test liquid (water) used in (1) was changed to pure water containing 30% by mass of diethylene glycol (water/DEG). Table 1 shows the liquid absorption amount with a contact time of 0.9 seconds.

TABLE 1

|  | Cobb method (g/m$^2$) | | | Liquid absorption amount (ml/m$^2$) | |
| --- | --- | --- | --- | --- | --- |
|  | Water 15 sec | Water 2 min | DEG 2 min | Water 0.5 sec | Water/DEG 0.9 sec |
| Recording medium 1 | 0.5 | 1.8 | 1.4 | 3.0 | 2.0 |
| Recording medium 2 | 0.1 | 0.9 | 1.4 | 2.8 | 1.8 |
| Recording medium 3 | 4.2 | 7.9 | 6.2 | 3.1 | 2.0 |
| Recording medium 4 | 2.8 | 3.9 | 4.8 | 2.8 | 2.0 |
| Recording medium C1 | 5.2 | 9.2 | 9.9 | 3.0 | 2.2 |
| Recording medium C2 | 3.2 | 6.2 | 5.7 | 1.7 | 0.9 |
| Recording medium C3 | 3.4 | 5.9 | 5.5 | 8.3 | 7.2 |

[Preparation of Ink Composition]

(Synthesis of Water-Insoluble Polymer Dispersant P-1) 88 g of methyl ethyl ketone was added to a 1000 ml three-necked flask equipped with an agitator and a condenser, and was heated to 72° C. under a nitrogen atmosphere. To this, a solution of 0.85 g of dimethyl 2,2'-azobisisobutyrate, 50 g of phenoxy ethylmethacrylate, 13 g of methacrylic acid and 37 g of methyl methacrylate dissolved in 50 g of methyl ethyl ketone was added dropwise over 3 hours. Once the dropwise addition was completed, the mixture was reacted for one more hour, and then a solution of 0.42 g of dimethyl 2,2'-azobisisobutyrate dissolved in 2 g of methyl ethyl ketone was added. The temperature was raised to 78° C., and the mixture was heated for 4 hours. The obtained reaction solution was precipitated two times in large excess of hexane, and the precipitated resin was dried to obtain 96.5 g of phenoxy ethylmethacrylate/methylmethacrylate/methacrylate (copolymerization ratio [% by mass ratio]=50/37/13) copolymer (resin dispersant P-1).

The composition of the obtained resin dispersant P-1 was confirmed by $^1$H-NMR, and the weight average molecular weight (Mw) determined by GPC was 49,400. Further, the acid value was determined by the method described in JIS Standards (JIS K0070: 1992), and the value was 84.8 mgKOH/g.

In addition, the weight average molecular weight was measured by gel permeation chromatography (GPC). HLC-8220 GPC (trade name) manufactured by Tosoh Corp. was used for the GPC, and TSK gel Super HZM-H, TSK gel Super HZ4000, and TSK gel Super HZ2000 (trade names, all manufactured by Tosoh Corp.) were used as the columns and were connected in a series of three. The eluent liquid used was THF (tetrahydrofuran). For the conditions, the sample concentration was 0.35%, the flow rate was 0.35 ml/min, the amount of sample injection was 10 μL, the measurement temperature was 40° C., and an RI detector was used. A calibration curve was produced from 8 samples of "standard sample TSK standard, polystyrene": "F-40," "F-20," "F-4," "F-1," "A-5000," "A-2500," "A-1000" and "n-propylbenzene" (trade names) manufactured by Tosoh Corp.

(Production of Coloring Material Particle Dispersion C)

10 parts of Pigment Blue 15:3 (Phthalocyanine Blue A220, trade name, manufactured by Dainichi Seka Co., Ltd.; cyan pigment), 4 parts of the polymer dispersant P-1, 44 parts of methyl ethyl ketone, 4.4 parts of a 1 mol/L aqueous NaOH solution, and 85.2 parts of Ion exchange water were mixed, and the mixture was dispersed for 2 hours to 6 hours by a bead mill using zirconia beads of 0.1 mm in diameter.

Methyl ethyl ketone was removed from the obtained dispersion under reduced pressure at 55° C., and a portion of water was further removed. Subsequently, centrifugation was performed for 30 minutes at 8000 rpm using a High Speed Refrigerated Centrifuge 7550 (trade name, manufactured by Kubota Corp.) and using a 50 mL centrifuge tube, to recover a supernatant other than the precipitate. Subsequently, the pigment concentration was determined from an absorbance spectrum, and thus a coloring particle dispersion C was obtained as a dispersion of resin-coated pigment particles (encapsulated pigment) with a pigment concentration of 10.2% by mass.

(Production of Self-Dispersing Polymer Particles (Exemplary Compound B-01))

360.0 g of methyl ethyl ketone was introduced into a two litter three-necked flask equipped with an agitator, a thermometer, a reflux condenser and a nitrogen gas inlet tube, and the temperature was increased to 75° C. While maintaining the temperature in the flask at 75° C., a mixed solution formed from 180.0 g of phenoxyethyl acrylate, 162.0 g of methylmethacrylate, 18.0 g of acrylic acid, 72 g of methyl ethyl ketone and 1.44 g of "V-601" (trade name, manufactured by Wako Pure Chemical Industries, Ltd.) was added dropwise at a constant rate so that dropwise addition would be completed in 2 hours. Once the dropwise addition was completed, a solution formed from 0.72 g of "V-601" and 36.0 g of methyl ethyl ketone was added, and the mixture was stirred for 2 hours at 75° C. A solution formed from 0.72 g of "V-601" and 36.0 g of methyl ethyl ketone was further added, and the mixture was stirred for 2 hours at 75° C. Thereafter, the temperature was increased to 85° C., and stirring was continued for 2 hours to obtain a resin solution of phenoxyethylacrylate/methylmethacrylate/acrylic acid (=50/45/5 [mass ratio]) copolymer.

The weight average molecular weight (Mw) of the copolymer obtained, which is determined in the same manner as above, was 64,000 (obtained as a polystyrene-equivalent value by gel permeation chromatography (GPC) in the same manner as above). The acid value was 38.9 mgKOH/g.

Then, 668.3 g of the obtained resin solution was weighed, 388.3 g of isopropanol, and 145.7 ml of a 1 mol/L NaOH aqueous solution were added to the resin solution, and then the temperature inside the reaction vessel was elevated to 80° C. Thereafter, 720.1 g of distilled water was added dropwise into the reaction vessel at a rate of 20 ml/min so as to form a water dispersion. The mixture was allowed to stand, under atmospheric pressure, at a reaction vessel inside temperature of 80° C. for 2 hours, and then 85° C. for 2 hours, and then 90° C. for 2 hours. Subsequently, the inside of the reaction vessel was depressurized, and the isopropanol, the methyl ethyl ketone and the distilled water were removed in a total amount of 913.7 g. As a result, a water dispersion of self-dispersing polymer particles (exemplary compound B-01) having a solid concentration of 28.0% by mass was obtained.

(Preparation of Ink Composition for Ink Jet)

—Preparation of Ink Composition C-1—

The dispersion of pigment particles C and the self-dispersing polymer particles (exemplary compound B-01) obtained as described above and polymerizable compound 1 were mixed to obtain the following ink composition. This was filled in a disposable syringe made of plastic, and filtered through a 5 μm PVDF filter (MILLEX-SV (trade name), diameter 25 mm, manufactured by Millipore Corp.), to produce a cyan ink (ink composition for ink jet) C-1.

Viscosity (25° C.) of thus obtained cyan ink C-1 was measured by using DV-III ULTRA CP (trade name) manufactured by Brookfield Engineering Labs., and it was found to be 4.2 mPa·s.

| -Ink composition- | |
|---|---|
| Coloring material particle dispersion C | 29.4% |
| Aqueous dispersion of self-dispersing polymer particles (B-01) (solid content) | 1% |
| Water-soluble polymerizable compound (polymerizable compound 1 described below) | 22% |
| SUNNIKS GP-250 (trade name) (manufactured by Sanyo Chemical Industries, Ltd.) | 1.5% |
| Olfine E1010 (trade name: manufactured by Nissin Chemical Industry Co., Ltd.) | 1% |
| IRGACURE 2959 (trade name: manufactured by Ciba Inc.) | 3.3% |
| Ion exchange water | residual amount (added to have the total amount of 100% by mass) |

—Preparation of Ink Composition C-2 to C-9—

Ink composition C-2 to C-9 were respectively produced in the same manner as described above, except that the content ratio was changed by using the water-soluble polymerizable compounds shown in the following Table 2 instead of polymerizable compound 1 for the preparation of the ink composition C-1.

Further, polyethylene glycol diacrylate (trade name: A-400, manufactured by Shin Nakamura Chemical Co., Ltd.) was used as polymerizable compound 31.

—Preparation of Ink Composition C-10—

Ink composition C-10 was produced in the same manner as described above, except that polymerizable compound 1 was not added for the preparation of the ink composition C-1.

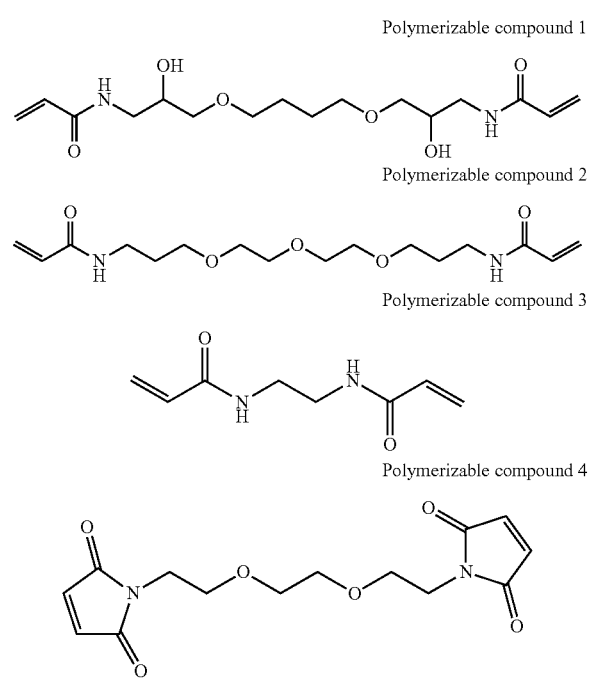

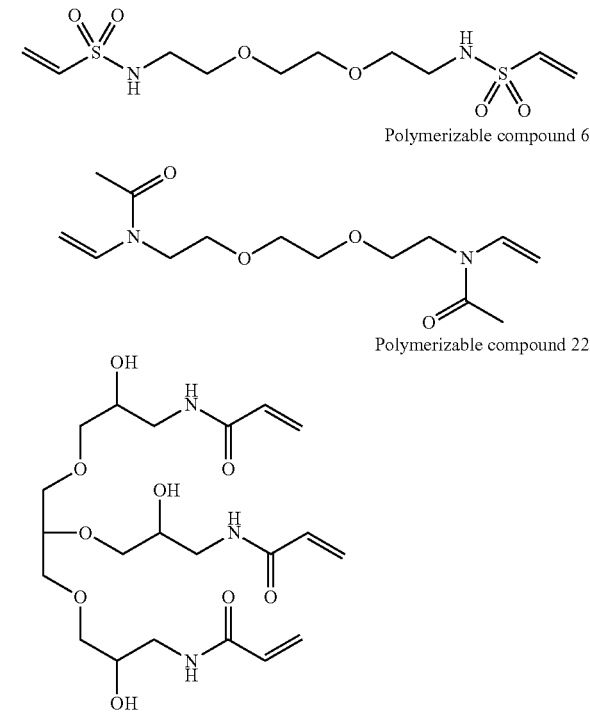

(Preparation of Treatment Liquid 1)

Treatment liquid 1 was prepared by mixing the components having the composition as follows. Viscosity, surface tension and pH (25° C.) of the treatment liquid were as follows: viscosity of 2.5 mPa·s, surface tension of 40 mN/m, and pH of 1.0. The surface tension was measured using a fully automatic surface tensiometer (trade name: CBVP-Z tensiometer, manufactured by Kyowa Interface Science Co., LTD.). The viscosity was measured by using DV-III ULTRA CP (trade name) manufactured by Brookfield Engineering Labs. pH was measured with the pH meter HM-30R (trade name) manufactured by DKK-TOA Corporation.

| -Composition of treatment liquid 1- | |
|---|---|
| Malonic acid (manufactured by Wako Pure Chemical Industries, Ltd.) | 12.5% |
| Malic acid (manufactured by Wako Pure Chemical Industries, Ltd.) | 12.5% |
| Diethylene glycol monobutyl ether (manufactured by Wako Pure Chemical Industries, Ltd.) | 20.0% |
| EMULGEN 109P (trade name: manufactured by Kao Corporation, nonionic surface active agent) | 1.0% |
| Ion exchange water | 54% |

Example 1 to Example 13 and Comparative Example 1 to Comparative Example 4

Forming and Evaluation of Image

By using treatment liquid 1, the recording medium and the ink composition obtained from the above to have the combination shown in the following Table 2, forming and evaluation of an image (i.e., curl, cockle and adhesion) were carried out as follows. Evaluation results are shown in the following Table 2.

Piezo full-line ink jet head of 1,200 dpi/20 inch width was prepared, and the ink composition obtained from the above was again filled into the storage tank which is connected to the ink jet head. The recording medium was fixed on a stage which is movable in a predetermined linear direction at 500 mm/sec, and the stage temperature was maintained at 30° C. Treatment liquid 1 obtained above was coated with a bar coater to obtain a thickness of about 1.2 μm, and immediately after the coating, it was dried for 2 seconds at 50° C.

Subsequently, the ink jet head was disposed and fixed such that the direction of the line head where the nozzles were aligned (main scanning direction) is tilted by 75.7° with respect to the direction which is perpendicular to the moving direction of the stage (sub-scanning direction). While the recording medium is moved at a constant speed in the sub-scanning direction, the ejection was carried out according to a line method under the ejection conditions of an amount of ink droplets of 2.8 μL, an ejection frequency of 25.5 kHz, a resolution of 1200 dpi×1200 dpi, and the maximum addition amount of the ink composition of 8.5 ml/m². Thereafter, onto the entire surface of a sample, which is a recording medium cut to have A5 size, the ink was ejected to form a solid image. After recording an image, heating was carried out from the opposite side (back side) of the ink application side using an IR heater and hot air of 120° C. was applied at 5 msec by using an air blower for 15 seconds for drying. After drying the image, UV ray (metal halide lamp manufactured by Eye Graphics Co. Ltd., maximum irradiation wavelength of 365 nm) was irradiated to have accumulated radiation amount of 3000 mJ/cm², and therefore the image was cured.

[Evaluation of Curl]

Curvature C of a sample was measured for the solid image sample which was prepared to have a size of 5 mm×50 mm so that the long side forms an arc at the time of curling.

—Curvature Measurement Method—

Curvature C of the sample after forming an image with the ink jet recording liquid by the method described above was measured under the environment including relative humidity of 50% at 25° C. Further, having the curl as a circular arc of the diameter R, the curl value is expressed with the following equation 1.

$$C=1/R(m) \quad \text{(Equation 1)}$$

—Evaluation Criteria—

A: Curvature C of the sample was not more than 20, ten minutes after forming an image.

B: Curvature C of the sample was not more than 20, one day after forming an image.

C: Curvature C of the sample was not more than 20, seven days after coating.

D: Curvature C of the sample was more than 20, seven days after coating.

[Evaluation of Cockle]

Using a postcard-sized recording medium coated with a top coat layer, a 100% single-colored solid image with a size of 10 cm by 1.5 cm was printed at the center of the medium. After forming an image, it was left for 1 hour under the environment including relative humidity of 80% at 35° C. Thereafter, the maximum height of the waves which occurred under the environment including relative humidity of 50% at 25° C. was measured by using a laser displacement sensor (manufactured by Keyence Corporation).

—Evaluation Criteria—

A: less than 2 mm

B: 2 mm or more but less than 4 mm

C: 4 mm or more

[Evaluation of Adhesion]

Two days after forming an image on the solid image portion that had been produced according to the method described above, CELLOTAPE (registered trade mark) was applied and peeled off right away so as to evaluate the degree of peeling of the formed image by naked eye observation. Evaluation criteria are as follows and the four-level evaluation was carried out according to the degree of peeling.

—Evaluation Criteria—

A: Absolutely no peeling was found.

B: No peeling of the image was recognized, however, very little coloration on the adhesive side of the peeled tape was observed.

C: Very little blank medium was shown from the image portion and coloration on the adhesive side of the peeled tape was observed.

D: Peeling of the image portion in the form of white spot was conspicuous according to naked eye observation, and thus it corresponds to a practically unusable level.

TABLE 2

|  |  | Ink composition | | | | | |
|  |  |  | Polymerizable compound | | | | |
|  | Recording medium | Type | Type | Content ratio (%) | Viscosity (mPa·s) | Curl | Cockle | Adhesion |
| --- | --- | --- | --- | --- | --- | --- | --- | --- |
| Example 1 | Recording medium 1 | C-1 | 1 | 22 | 4.2 | B | A | B |
| Example 2 | Recording medium 1 | C-2 | 2 | 22 | 4.3 | B | A | A |
| Example 3 | Recording medium 1 | C-3 | 3 | 22 | 4.0 | B | A | A |
| Example 4 | Recording medium 1 | C-4 | 4 | 22 | 4.3 | B | B | B |
| Example 5 | Recording medium 1 | C-5 | 5 | 22 | 4.2 | B | B | B |
| Example 6 | Recording medium 1 | C-6 | 6 | 22 | 4.2 | B | B | B |
| Example 7 | Recording medium 1 | C-7 | 22 | 22 | 4.6 | B | A | A |

TABLE 2-continued

| | | Ink composition | | | | | |
| | | | Polymerizable compound | | | | | |
| | Recording medium | Type | Type | Content ratio (%) | Viscosity (mPa·s) | Curl | Cockle | Adhesion |
|---|---|---|---|---|---|---|---|---|
| Example 8 | Recording medium 1 | C-8 | 31 | 22 | 3.8 | C | B | C |
| Example 9 | Recording medium 2 | C-9 | 2 | 18 | 4.1 | A | A | A |
| Example 10 | Recording medium 2 | C-9 | 2 | 18 | 4.1 | A | A | A |
| Example 11 | Recording medium 2 | C-9 | 2 | 18 | 4.1 | A | A | A |
| Example 12 | Recording medium 3 | C-2 | 2 | 22 | 4.3 | B | B | B |
| Example 13 | Recording medium 4 | C-2 | 2 | 22 | 4.3 | B | A | B |
| Comparative example 1 | Recording medium 1 | C-10 | — | — | 1.8 | C | C | D |
| Comparative example 2 | Recording medium C1 | C-1 | 1 | 22 | 4.2 | D | C | D |
| Comparative example 3 | Recording medium C2 | C-1 | 1 | 22 | 4.2 | D | C | D |
| Comparative example 4 | Recording medium C3 | C-1 | 1 | 22 | 4.2 | D | C | D |

It is found from the Table 2 that, according to the image forming method of the invention, occurrence of a curl and a cockle is inhibited so that an image having excellent adhesion to a recording medium is formed.

The invention includes the following exemplary embodiments.

<1> An image forming method comprising:
applying an ink that forms an image by inkjetting an ink composition containing coloring particles, a water-soluble polymerizable compound, a polymerization initiator and water onto a recording medium in which a base paper, a first layer containing a binder, and a second layer containing a white pigment are layered in this order, and a Cobb water absorption degree on a surface of the first layer placed on the base paper is 5.0 g/m² or less as measured by a water absorption degree test with a contact time of 15 seconds, and a water absorption amount on a surface of the second layer is 2 mL/m² to 8 mL/m² as measured by a Bristow method with a contact time of 0.5 seconds.

<2> The image forming method of <1>, wherein the water-soluble polymerizable compound comprises at least two polymerizable functional groups selected from the group consisting of a (meth)acrylamide group, a maleimide group, a vinylsulfone group and a N-vinylamide group.

<3> The image forming method of <1> or <2>, wherein at least one of the polymerizable functional group is a (meth)acrylamide group.

<4> The image forming method of any one of <1> to <3>, wherein the Cobb water absorption degree on the surface of the first layer placed on the base paper is 2.0 g/m² or less as measured by the water absorption degree test with a contact time of 2 minutes.

<5> The image forming method of any one of <1> to <4>, wherein a Cobb value on the surface of the first layer placed on the base paper is 5.0 g/m² or less as measured by the water absorption degree test using diethylene glycol instead of water with a contact time of 2 minutes and a liquid absorption amount on the surface of the second layer is 1 mL/m² to 6 mL/m² as measured by the Bristow method by using water containing 30% by mass of diethylene glycol with a contact time of 0.9 seconds.

<6> The image forming method of any one of <1> to <5>, wherein the binder in the first layer comprises a thermoplastic resin.

<7> The image forming method of <6>, wherein the thermoplastic resin comprises polyester urethane latex or acrylsilicone latex.

<8> The image forming method of any one of <1> to <7>, wherein the first layer further comprises a layered inorganic compound in addition to the binder.

<9> The image forming method of any one of <1> to <8>, wherein the binder comprises polyvinyl alcohol or acetoacetyl modified polyvinyl alcohol.

<10> The image forming method of <9>, wherein the first layer comprises, as a hardener, at least one selected from an aldehyde compound, 2,3-dihydroxy-1,4-dioxane and its derivatives, and a compound having in a single molecule at least two vinyl groups that are adjacent to a substituent group with positive Hammett's substituent constant $\sigma_p$.

<11> The image forming method of any one of <1> to <10>, wherein the white pigment in the second layer comprises kaolin, titanium oxide, or a mixture of kaolin and titanium oxide.

<12> The image forming method of any one of <1> to <11>, wherein a layer surface pH in the second layer is less than 8.0.

<13> The image forming method of any one of <1> to <12>, wherein the ink composition comprises 3% to 20% by mass of the water-soluble polymerizable compound.

<14> The image forming method of any one of <1> to <13>, wherein a content ratio of the water-soluble polymerizable compound compared to the coloring particles (i.e., water-soluble polymerizable compound/coloring particles) in the ink composition is from 1 to 30 in terms of mass ratio.

<15> The image forming method of any one of <1> to <14>, wherein the ink composition has a viscosity (25° C.) of 1 to 10 mPa·s.

<16> The image forming method of any one of <1> to <15>, wherein a water-insoluble polymer dispersant is included as a dispersant when the ink composition comprises a pigment as the coloring particles.

<17> The image forming method of <16>, wherein the water-insoluble polymer dispersant comprises a vinyl polymer which has a carboxy group as a hydrophilic structural unit.

<18> The image forming method of any one of <1> to <17>, wherein the ink composition comprises at least one kind of resin particle.

<19> The image forming method of any one of <1> to <18>, wherein a maximum addition amount of the ink composition in the applying of the ink is 3 to 20 ml/m$^2$.

<20> The image forming method of any one of <1> to <19>, further comprising:

irradiating the ink composition that has been applied to the recording medium with an actinic energy ray having an accumulated radiation amount of 10 to 5000 mJ/cm$^2$.

All publications, patent applications, and technical standards mentioned in this specification are herein incorporated by reference to the same extent as if each individual publication, patent application, or technical standard was specifically and individually indicated to be incorporated by reference.

What is claimed is:

1. An image forming method comprising:

applying an ink that forms an image by inkjetting an ink composition containing coloring particles, a water-soluble polymerizable compound, a polymerization initiator and water onto a recording medium in which a base paper, a first layer containing a binder, and a second layer containing a white pigment are layered in this order, and a Cobb water absorption degree on a surface of the first layer placed on the base paper is 5.0 g/m$^2$ or less as measured by a water absorption degree test with a contact time of 15 seconds, and a water absorption amount on a surface of the second layer is from 2 mL/m$^2$ to 8 mL/m$^2$ as measured by a Bristow method with a contact time of 0.5 seconds, wherein the ink composition contains water at a content of from 30% by mass to 90% by mass and the water-soluble polymerizable compound at a content of from 1% by mass to 30% by mass, with respect to a total mass of the ink composition.

2. The image forming method of claim 1, wherein the water-soluble polymerizable compound comprises at least two polymerizable functional groups selected from the group consisting of a (meth)acrylamide group, a maleimide group, a vinylsulfone group and a N-vinylamide group.

3. The image forming method of claim 1, wherein the water-soluble polymerizable compound has a (meth)acrylamide group.

4. The image forming method of claim 1, wherein the Cobb water absorption degree on the surface of the first layer placed on the base paper is 2.0 g/m$^2$ or less as measured by the water absorption degree test with a contact time of 2 minutes.

5. The image forming method of claim 1, wherein a Cobb value on the surface of the first layer placed on the base paper is 5.0 g/m$^2$ or less as measured by the water absorption degree test using diethylene glycol instead of water with a contact time of 2 minutes and a liquid absorption amount on the surface of the second layer is from 1 mL/m$^2$ to 6 mL/m$^2$ as measured by the Bristow method by using water containing 30% by mass of diethylene glycol with a contact time of 0.9 seconds.

6. The image forming method of claim 1, wherein the binder in the first layer comprises a thermoplastic resin.

7. The image forming method of claim 6, wherein the thermoplastic resin comprises polyester urethane latex or acrylsilicone latex.

8. The image forming method of claim 1, wherein the first layer further comprises a layered inorganic compound in addition to the binder.

9. The image forming method of claim 1, wherein the binder comprises polyvinyl alcohol or acetoacetyl modified polyvinyl alcohol.

10. The image forming method of claim 9, wherein the first layer comprises, as a hardener, at least one selected from the group consisting of an aldehyde compound, 2,3-dihydroxy-1,4-dioxane and its derivatives, and a compound having in a single molecule at least two vinyl groups that are adjacent to a substituent group with positive Hammett's substituent constant $\sigma_p$.

11. The image forming method of claim 1, wherein the white pigment in the second layer comprises kaolin, titanium oxide, or a mixture of kaolin and titanium oxide.

12. The image forming method of claim 1, wherein a layer surface pH in the second layer is less than 8.0.

13. The image forming method of claim 1, wherein the ink composition comprises from 3% to 20% by mass of the water-soluble polymerizable compound.

14. The image forming method of claim 1, wherein a content ratio of the water-soluble polymerizable compound compared to the coloring particles (i.e., water-soluble polymerizable compound/coloring particles) in the ink composition is from 1 to 30 in terms of mass ratio.

15. The image forming method of claim 1, wherein the ink composition has a viscosity (25° C.) of from 1 to 10 mPa·s.

16. The image forming method of claim 1, wherein a water-insoluble polymer dispersant is included as a dispersant when the ink composition comprises a pigment as the coloring particles.

17. The image forming method of claim 16, wherein the water-insoluble polymer dispersant comprises a vinyl polymer which has a carboxy group as a hydrophilic structural unit.

18. The image forming method of claim 1, wherein the ink composition comprises at least one kind of resin particle.

19. The image forming method of claim 1, wherein a maximum addition amount of the ink composition in the applying of the ink is from 3 to 20 ml/m$^2$.

20. The image forming method of claim 1, further comprising:

irradiating the ink composition that has been applied to the recording medium with an actinic energy ray having an accumulated radiation amount of from 10 to 5000 mJ/cm$^2$.

21. The image forming method of claim 1, wherein the water-soluble polymerizable compound comprises at least two polymerizable functional groups, one of which being a (meth)acrylamide group and the other of which being selected from the group consisting of a (meth)acrylamide group, a maleimide group, a vinylsulfone group and a N-vinylamide group.

* * * * *